United States Patent
Wildman et al.

(10) Patent No.: US 8,526,188 B2
(45) Date of Patent: Sep. 3, 2013

(54) BUCKET-STYLE FIRE RESISTANT ENCLOSURE AND A METHOD FOR MAKING THE SAME

(75) Inventors: Kelvin H. Wildman, Honeoye Falls, NY (US); Adam C. Perry, Ontario, NY (US)

(73) Assignee: John D. Brush & Co., Inc., Rochester, NY (US)

( * ) Notice: Subject to any disclaimer, the term of this patent is extended or adjusted under 35 U.S.C. 154(b) by 735 days.

(21) Appl. No.: 12/673,673

(22) PCT Filed: Aug. 21, 2008

(86) PCT No.: PCT/US2008/073866
§ 371 (c)(1),
(2), (4) Date: Feb. 16, 2010

(87) PCT Pub. No.: WO2009/026440
PCT Pub. Date: Feb. 26, 2009

(65) Prior Publication Data
US 2011/0017747 A1    Jan. 27, 2011

Related U.S. Application Data

(60) Provisional application No. 60/957,048, filed on Aug. 21, 2007.

(51) Int. Cl.
*H05K 5/00*    (2006.01)
(52) U.S. Cl.
USPC .......................... 361/730; 361/729; 361/731
(58) Field of Classification Search
USPC ................. 361/730, 726, 695, 729; 174/52.3
See application file for complete search history.

(56) References Cited

U.S. PATENT DOCUMENTS 5,096,427 A    3/1992    Sadigh-Behzadi
5,750,925 A    5/1998    Purdom
(Continued)

FOREIGN PATENT DOCUMENTS

EP    0149525    7/1985
EP    0187499    7/1986
(Continued)

OTHER PUBLICATIONS

Cleveland, Terri P., "Fire Resistant Enclosure for a Data Storage Device Having Heat Sink Capabilities and Method for Making the Same," U.S. Appl. No. 12/673,662, filed Feb. 16, 2010.

(Continued)

*Primary Examiner* — Timothy Thompson
*Assistant Examiner* — Andargie M Aychillhum
(74) *Attorney, Agent, or Firm* — Woods Oviatt Gilman LLP

(57) ABSTRACT

A fire resistant enclosure comprising an enclosure base including a base cap and a bucket-style base body is provided. The base body includes a bottom wall with a side wall extending upwardly therefrom defining a base cavity. The side wall includes an upper peripheral edge that defines an opening in the base cavity. A data storage device positioned within the base cavity. Fire resistant insulation material is positioned within the base cavity to encapsulate the data storage device, wherein the insulation material fills the base cavity to a level below the upper peripheral edge, wherein the base cap is configured to be coupled with the base body to enclose the data storage device within the enclosure base. In another aspect, an enclosure base and an enclosure lid may be provided, wherein each include bucket-style bodies. The enclosure base and lid define a storage compartment for the data storage device.

17 Claims, 19 Drawing Sheets

(56) References Cited

U.S. PATENT DOCUMENTS

| | | |
|---|---|---|
| 5,756,934 A | 5/1998 | Purdom |
| 5,810,919 A | 9/1998 | Olzak et al. |
| 6,158,833 A | 12/2000 | Engler |
| 6,299,950 B1 | 10/2001 | Byington et al. |
| 7,211,742 B2 | 5/2007 | Moore et al |
| 7,545,639 B2 * | 6/2009 | Ridge .......................... 361/690 |
| 2004/0236988 A1 | 11/2004 | Sastrel |
| 2005/0286225 A1 * | 12/2005 | Moore et al. .................. 361/695 |
| 2006/0143817 A1 | 7/2006 | Shebek et al. |
| 2007/0017685 A1 | 1/2007 | Moore et al. |
| 2008/0175983 A1 | 7/2008 | Moore |
| 2009/0050365 A1 | 2/2009 | Moore et al. |
| 2009/0179536 A1 | 7/2009 | Moore |
| 2009/0219679 A1 | 9/2009 | Moore et al. |

FOREIGN PATENT DOCUMENTS

| | | |
|---|---|---|
| EP | 1475803 | 11/2004 |
| GB | 2168402 | 6/1986 |

OTHER PUBLICATIONS

Cryovac Sealed Air Corporation, "FS 500 Series Films," Duncan, SC 29334.

Lefebvre, Stephane, "Written Opinion of the International Searching Authority," for International Application No. PCT/US08/073866, International Filing Date Aug. 21, 2008, mailed Apr. 3, 2009, European Patent Office, Rijswijk, Netherlands.

Lefebvre, Stephane, "International Search Report," for International Application No. PCT/US08/073866, International Filing Date Aug. 21, 2008, mailed Apr. 3, 2009, European Patent Office, Rijswijk, Netherlands.

* cited by examiner

BUCKET-STYLE FIRE RESISTANT ENCLOSURE AND A METHOD FOR MAKING THE SAME

CROSS-REFERENCE TO RELATED APPLICATIONS

This application is a National Stage filing under 35 U.S.C. §371 of International Application No. PCT/US2008/073866, filed Aug. 21, 2008, which in turn claims the benefit of U.S. Provisional Patent Application No. 60/957,048, filed on Aug. 21, 2007, which is incorporated herein by reference in its entirety.

TECHNICAL FIELD

The present invention relates to a bucket-style fire resistant enclosure and a method for making the same. More particularly, the present invention relates to a fire resistant enclosure including a bucket-style shell that is filled with a thermally insulating fire-resistant material below an upper edge thereof so that the insulation material is not in contact with a seam formed between the bucket component and an enclosure cap, thereby preventing leakage of the insulation material during assembly.

BACKGROUND OF THE INVENTION

Fire resistant enclosures are used to protect valuables, such as documents, from destruction by fire. Due to the importance of these valuables, delivering high quality products able to meet or exceed the performance characteristics for which the enclosure is designed is of utmost importance to the enclosure manufacturer.

A typical fire resistant enclosure includes a lid hingedly coupled with a base to define a storage compartment for storing and protecting valuables. Both the lid and the base include inner and outer shells that define an insulation cavity that may be filled with an insulation material that later cures within the insulation cavity to provide fire resistance. One method of forming the lid and base is by injection molding. For example, when forming either the lid and the base in existing injection molded safes, two separately injection molded shells are formed and subsequently joined together by welding. Welding the two injection molded shells creates a seam where the two shells were joined. The seam that is created in existing injection molded safes is typically in a location that is in direct contact or exposed to the insulation material that is filled within the insulation cavity, which has a number of drawbacks and deficiencies.

The quality of the seal between the shells is affected by the joining process itself and other factors such as the quality, uniformity, and cleanliness of the mating surfaces between the two shells. If the quality and uniformity of the welded seam is compromised during the joining process, by the characteristics of the mating surfaces of the shells, or by some other factor, the fire resistant insulation material may leak through the seam after it is placed in the insulation cavity, and prior to curing. The occurrence of an insulation leak through a seam may indicate that the integrity of the bond between the two shells that were welded together to form either the lid or the base is compromised. Therefore, the lid or base that leaked insulation through its seam may need to be discarded because of its failure to meet quality control standards due to a structural deficiency in the bonding of the shells. Moreover, if insulation leaks through the seam joining the shells, then an insufficient amount of insulation material may be left within the insulation cavity to obtain the desired fire test rating. In this case, re-welding the seam and refilling the insulation cavity with additional fire resistant insulation material will result in increased manufacturing costs. For these and other reasons, injection molded fire resistant enclosures that include seams in direct contact with liquid insulation materials during their manufacture are problematic.

Therefore, it would be advantageous to provide an injection molded fire resistant enclosure constructed with outer casing portions that include no seams between separate components that are in contact with fire resistant insulation materials so that no insulation material will leak through the seams.

SUMMARY OF THE INVENTION

A fire resistant enclosure for an electronic device, such as a data storage device, is provided. The enclosure may include an enclosure base comprising a base cap and a bucket-style seamless base body. The base body includes a bottom wall with a side wall extending upwardly therefrom defining a base cavity. The side wall includes an upper peripheral edge that defines an opening in the base cavity. The data storage device is positioned within the base cavity. A fire resistant insulation material is positioned within the base cavity to encapsulate the data storage device, wherein the insulation material fills the base cavity to a level, for example 0.25 inches, below the upper peripheral edge. The base cap is configured to couple with the base body to enclose the data storage device within the enclosure base. The fire resistant insulation material is filled below the upper peripheral edge of the base so that the insulation material does not leak out of the base cavity when being filled. The enclosure may further include an electrical cable assembly including a device cable connecting the data storage device to a data transfer port for connection with an external computing device. In particular, the data transfer port may be mounted in a port clearance hole defined in the side wall of the base body.

This aspect of the invention may further include a device support structure for positioning the data storage device within the base cavity, wherein the device support structure includes a device length spacer and a device width spacer extending upwardly from the bottom wall and inwardly from the side wall of the base body. A bottom surface of the base cap may comprise a plurality of base cap flanges having slots defined therein, wherein the slots are configured to interlock with a plurality of base cap anchors extending from the side wall of the base body. Further a plurality of downwardly extending posts that embed within the fire resistant insulation material are positioned within the base body cavity upon interlocking of the base cap flanges with the base cap anchors. Moreover, the electrical cable assembly may further comprise a status indicator cable connected to a status indicator mounted in an indicator clearance hole defined in the side wall of said base body, wherein the status indicator cable is further connected to the data transfer port and encapsulated in the base cavity.

A method of making a bucket-style fire resistant enclosure provided above is also provided. The method includes: providing a bucket-style seamless enclosure body including a bottom wall with a side wall extending upwardly therefrom defining a cavity, the side wall including an upper peripheral edge that defines an opening in said cavity; a data storage device; inserting the data storage device within the cavity; positioning fire resistant insulation material within the cavity to encapsulate the data storage device, wherein the insulation material fills the cavity to a level, for example 0.25 inches, below the upper peripheral edge; providing an enclosure cap; and coupling the enclosure cap with the upper peripheral edge of the enclosure body to enclose the data storage device within the fire resistant enclosure.

The method described above may further comprise: providing a data transfer port extending through a port clearance hole defined in the side wall of the enclosure body; and connecting the data storage device to the data transfer port. The method also may include connecting the data storage device to the data transfer port using a device cable, and encapsulating the device cable within the fire resistant insulation material. The method may also include: providing a status indicator hole in the body; providing a status indicator in the status indicator hole; connecting the status indicator to the electronic device using a status indicator cable; and encapsulating the status indicator cable within the fire resistant insulation material. The data storage device may be encapsulated with one inch of the fire resistant insulation material all the way around the data storage device.

Another aspect of the present invention provides a fire resistant enclosure comprising an enclosure base and an enclosure lid that are configured to define a storage compartment therebetween for storing a data storage device. The enclosure base comprises a base cap and a bucket-style base body. The base body includes a bottom wall with a side wall extending upwardly therefrom defining a base cavity. The side wall of the base body includes an upper peripheral edge that defines an opening in the base cavity. Fire resistant insulation material is positioned within the base cavity, wherein the insulation material fills the base cavity to a level, for example 0.25 inches, below the upper peripheral edge of the base body. The base cap is configured to be coupled with the upper peripheral edge of the base body. The enclosure lid comprises a lid cap and a bucket-style lid body. The lid body includes a bottom wall with a side wail extending upwardly therefrom defining a lid cavity. The side wall of the lid body includes an upper peripheral edge that defines an opening in the lid cavity. Fire resistant insulation material is positioned within the lid cavity, wherein the insulation material fills the lid cavity to a level, for example 0.25 inches, below the upper peripheral edge of the lid body. The lid cap is configured to be coupled with the upper peripheral edge of the lid body. The insulation material is filled below the upper peripheral edge of the base body and lid body so that the insulation material does not leak out of the base and lid cavities when being filled.

This aspect may further include a lid cap having a bottom surface and a plurality of tabs extended outwardly from the peripheral edge of the lid cap, wherein the bottom surface is coupled with a peripheral shoulder defined in the side wall of the lid body. A plurality of posts may extending downwardly from the bottom surface and embedded within the fire resistant insulation material, wherein the plurality of tabs are coupled with a plurality of slots defined in the wall of the lid body. It will be understood that a data storage device may be positioned within the storage compartment. This aspect may further include a data transfer port mounted to the side wall of said base body, and an electrical cable assembly including a device cable for connecting a data storage device to the first data transfer port. This aspect may also include a first data transfer port mounted to the side wall of the base body, a second data transfer port mounted to an internal wall of the base body for access with the storage compartment, and an electrical cable assembly including a device cable for connecting the first data transfer port and the second data transfer port. Further, a bottom surface of the lid cap may comprise a plurality of lid cap flanges having slots defined therein, the slots being configured to interlock with a plurality of lid cap anchors extending from the side wall of the lid body. A plurality of posts may be embedded within the fire resistant insulation material positioned within the lid cavity upon interlocking of the lid cap flanges with the lid cap anchors.

A method of making the bucket-style fire resistant enclosure described above may include: providing a bucket-style seamless enclosure base body including a bottom wall with a side wall extending upwardly therefrom defining a base cavity, the side wall including an upper peripheral edge that defines an opening in the base cavity, the base body defining a first portion of an internal storage compartment; positioning fire resistant insulation material within the base cavity, wherein the insulation material fills the base cavity to a level below the upper peripheral edge of the side wall of the base body; providing a base cap; coupling the base cap with the upper peripheral edge of the base body; providing a bucket-style seamless enclosure lid body including a bottom wall with a side wall extending upwardly therefrom defining a lid cavity, the side wall including an upper peripheral edge that defines an opening in the lid cavity, the lid body defining a second portion of the internal storage compartment; positioning fire resistant insulation material within the lid cavity, wherein the insulation material fills the lid cavity to a level below the upper peripheral edge of the side wall of the lid body; providing a lid cap; coupling the lid cap with the upper edge of the lid body; allowing a data storage device to be placed within the internal storage compartment defined by the base body and the lid body; and allowing the base body to be coupled with the lid body to protect the data storage device within the fire resistant enclosure. The method described above may further comprise providing a data transfer port extending through a port clearance hole defined in the base body; and connecting the data storage device to the data transfer port. In addition, the method may include hingedly connecting the base body with the lid body.

BRIEF DESCRIPTION OF THE DRAWINGS

The above-mentioned and other features and advantages of this invention, and the manner of attaining them, will become apparent and be better understood by reference to the following description of the aspects of the invention in conjunction with the accompanying drawings, wherein.

Additional objects, advantages, and novel features of the invention will be set forth in part in the description that follows, and in part will become apparent to those in the practice area of the invention.

DETAILED DESCRIPTION OF THE INVENTION

Figure 1:
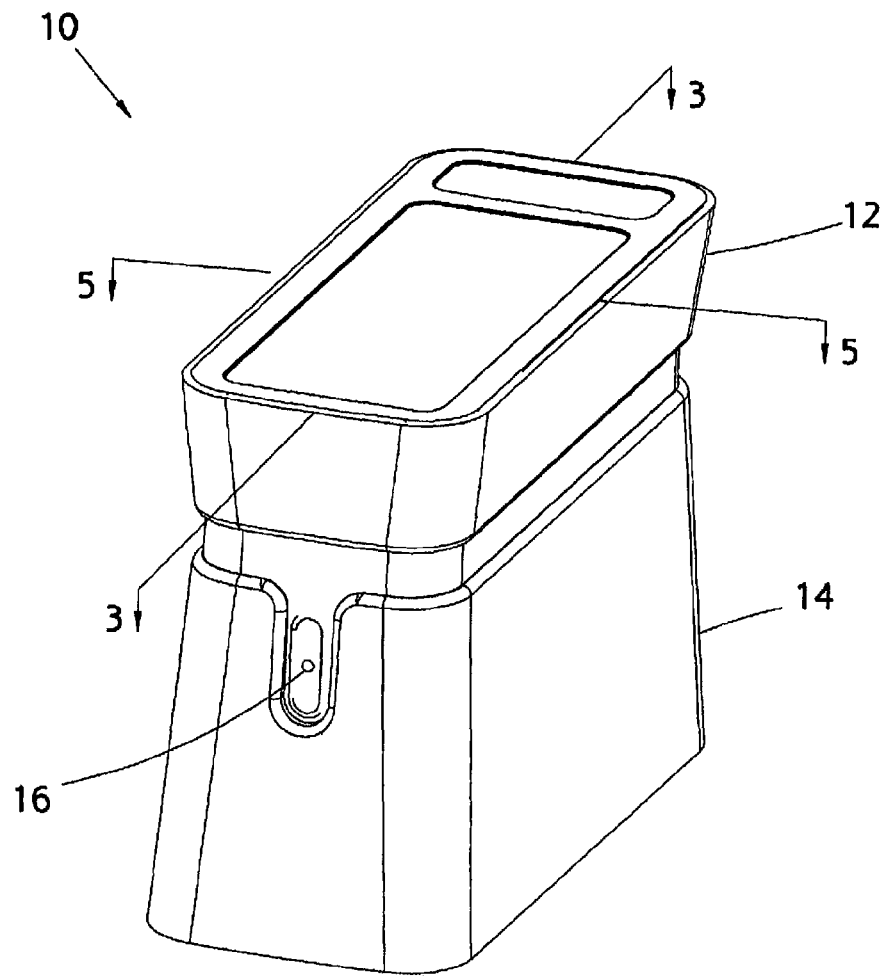
FIG. 1 is a front perspective view of a fire resistant enclosure in accordance a first aspect of the present invention.
Figure 2:
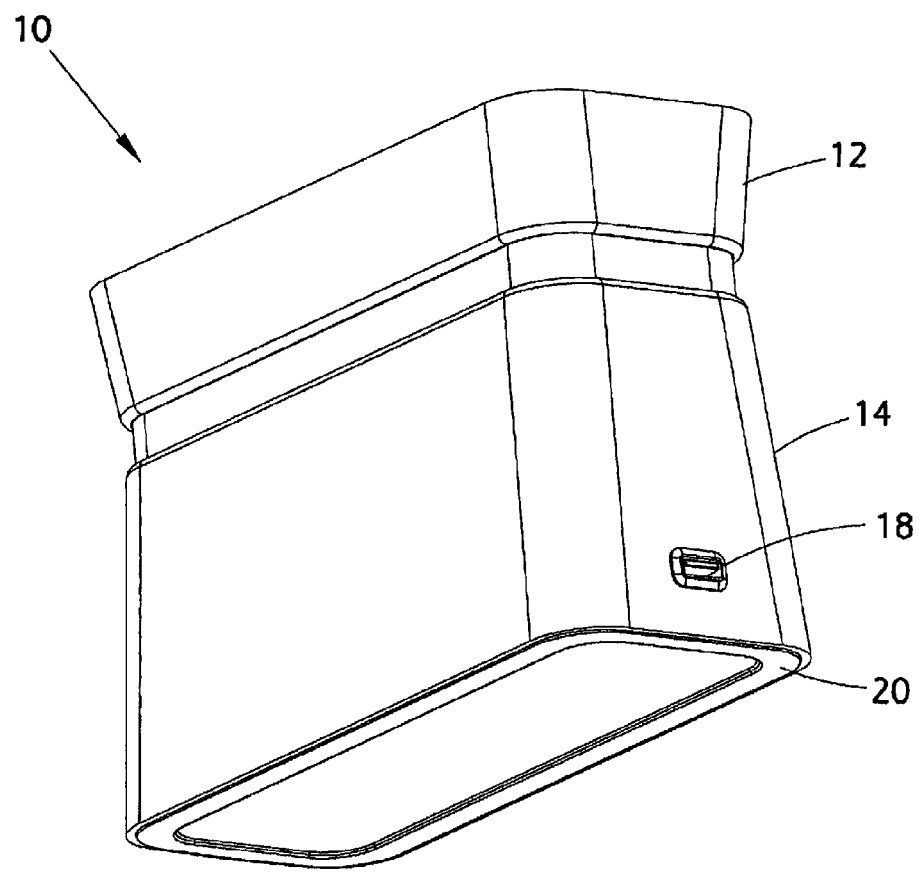
FIG. 2 is a rear perspective view of the fire resistant enclosure shown in FIG. 1.
Figure 3:
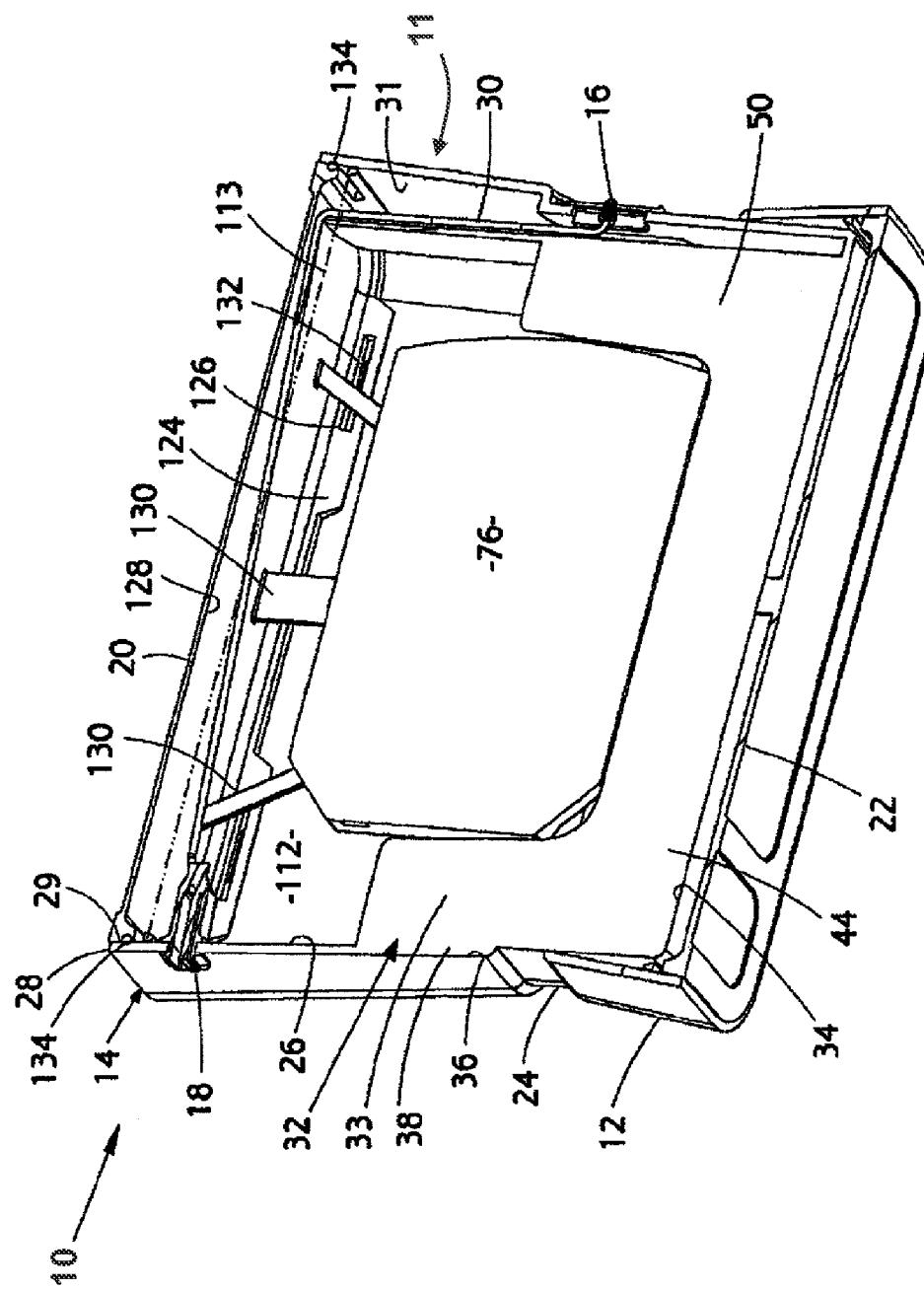
FIG. 3 is an inverted perspective view of a cross section taken along line 3-3 of the fire resistant enclosure shown in FIG. 1.

Referring to the drawings in detail, and particularly FIGS. 1-3, a first aspect of a bucket-style fire resistant enclosure is shown generally as reference numeral 10. Bucket-style fire resistant enclosure 10 generally includes an enclosure base 11 comprising a base body 14 and a base cap 20, wherein base body 14 is used to house an electronic device, such as a data storage device 76, within a thermally insulating fire-resistant material 112 to protect data storage device 76 from fire, water, and other environmental hazards. The insulation material 112 is filled to a level below an upper peripheral edge of base body 14 and then capped with base cap 20, wherein the insulation material does not contact the interface between base body 14 and base cap 20 to eliminate the possibility of the fire resistant insulation leaking therethrough prior to curing. Fire resistant enclosure 10 may also include an enclosure cover 12 that attaches to base body 14, a status indicator 16 to provide the operational status of data storage device 76, a data transfer port 18 for connecting data storage device 76 to an external computing system. It will be understood that data transfer port 18, for example, a USB port, may allow power, data, and communication signals to pass therethrough.

Figure 4:
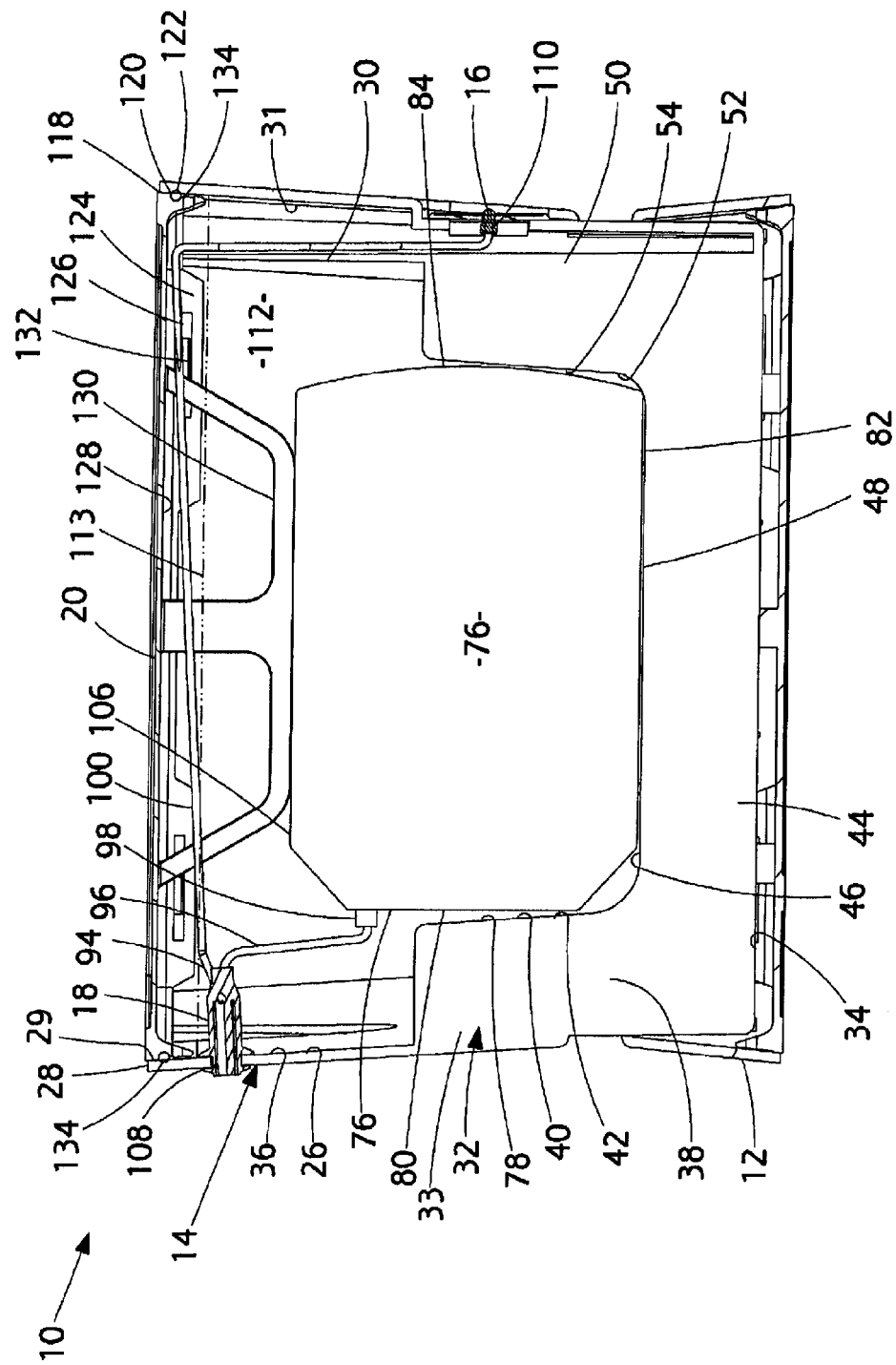
FIG. 4 is an inverted cross sectional view taken along line 3-3 of the fire resistant enclosure shown in FIG. 1.
Figure 5:
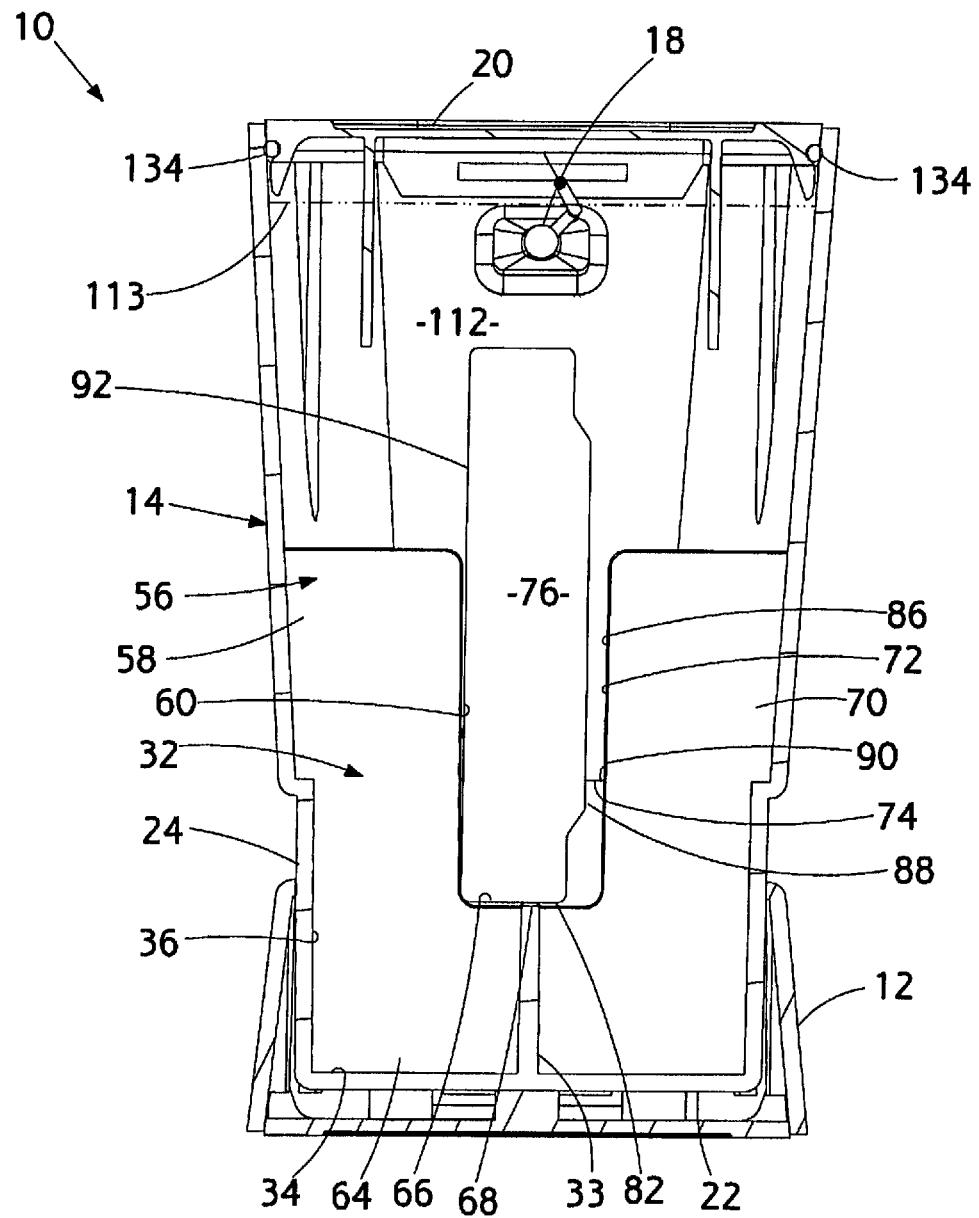
FIG. 5 is a cross sectional view taken along line 5-5 of the fire resistant enclosure shown in FIG. 1.

Referring now to FIGS. 3-5, base body 14 of enclosure 10 is shown in an upside down orientation because base body 14 is a bucket-style body that is filled and capped before overturning it to the orientation as shown in FIGS. 1-2. Base body 14 may be formed by an injection molding process using a polymeric resin, for example, high density polyethylene (HDPE), that has a melting point higher than the boiling point of water. Base body 14 includes a seamless bottom wall 22 and a seamless side wall 24 extending upwardly therefrom defining a base body cavity 26. Side wall 24 includes an upper peripheral edge 28 that defines an opening 29 in base body cavity 26 to allow fire resistant insulation material 112 to be poured within base body cavity 26. With particular reference to FIGS. 3 and 4, bottom wall 22 may further comprise an upwardly extending partition 30 that operates in conjunction with side wall 24 to define a status indicator cavity 31 within base body 14. It will be understood that status indicator cavity 31 does not necessarily need to be filled with insulation material 112 to prevent status indicator 16 from corroding.

With reference to FIGS. 3 and 4, base body 14 may further comprise a support structure 32 for positioning data storage device 76 within enclosure 10. Support structure 32 includes a device length spacer 33 extending upwardly from an internal bottom surface 34 and inwardly from an internal side surface 36 of base body 14. Device length spacer 33 comprises a first end portion 38 having an inner edge 40 that includes a plurality of spacing tabs 42, a middle portion 44 having an upper edge 46 including a plurality of spacing tabs 48, and a second end portion 50 having an inner edge 52 including a plurality of spacing tabs 54. Further, as best seen in FIG. 5, base body 14 may comprise a device width spacer 56 extending upwardly from internal bottom surface 34 and inwardly from internal side surface 36 of base body 14. Device width spacer 56 comprises a first end portion 58 having an inner edge 60, a middle portion 64 having an upper edge 66 including a plurality of spacing tabs 68, and a second end portion 70 having an inner edge 72 including a plurality of spacing tabs 74.

Device length spacer 33 and device width spacer 56 may be configured to support an electronic device 76, such as, but not limited to, a 2.5" hard disc drive (FIGS. 3-5 and 11), 3.5" hard disc drive (FIG. 19) or other type of data storage device, within base body cavity 26 of fire resistant enclosure 10. In the instance that electronic device 76 is a hard disc drive, it is understood that some off-the-shelf hard disc drive assemblies may include the hard disc drive enclosed in an outer protective shell, wherein an air gap is present between the outer protective shell and the hard disc drive. It should be understood that the fire-resistant insulation that is described as being in intimate contact with the hard disc drive is preferably in intimate contact with the hard disc drive itself, and not necessarily the outer protective shell, wherein air gaps between the fire-resistant insulation and the hard disc drive are minimized or eliminated.

In operation, spacing tabs 42, 48, 54 of device length spacer 33 may operate to create a plurality of device length filling gaps 78 between inner edges 40, 46, 52 and a first edge 80, a bottom edge 82, and a second edge 84 of data storage device 76, respectively. Similarly, spacing tabs 68, 74 of device width spacer 56 may operate to create a plurality of device width filling gaps 86 between inner edges 66, 72 and bottom edge 82, and a second side surface 88 of electronic device 76. Further, plurality of spacing tabs 74 of second end portion 70 of device width spacer 56 may have a length 90 operable to bias a first side surface 92 of data storage 76 against inner edge 60 of first portion 58 of device width spacer 56.

As best seen in FIG. 4, an electrical cable assembly 94 may comprise data transfer port 18, an electronic device cable 96, and an electronic device connector 98. Electronic device connector 98 may be plugged into data storage device 76 so that electronic device cable 96 may conduct power, data, and communication signals between electronic device 76 and data transfer port 18, for example, a USB connection port. Electrical cable assembly 94 may further comprise status indicator 16, such as an LED, and a status indicator cable 100 that is routed through base cavity 26 and over partition 30 and operate to conduct signals indicating conditions such as, but not limited to, power status of data storage device 76 to status indicator 16.

Electronic device connector 98 and/or data storage device 76 may be encased in a barrier 106, for example, a plastic bag or dipped in a curable sealant, to prevent insulation material 112 from penetrating any openings formed in data storage device 76. One type of bag that may be used is formed of a multi-layer (e.g., 2 layers) coextruded film that is about 5 millimeters thick, such as a FS 5050 film manufactured by Cryovac Sealed Air Corporation, Duncan, S.C.

Data storage device 76 is installed into base body cavity 26 and is supported by device length spacer 33 and device width spacer 56. Data transfer port 18 may be installed in a port clearance hole 108 defined in side wall 24, and status indicator 16 may be installed in an indicator clearance hole 110 in a portion of side wall 24 that defines status indicator cavity 31. Data storage device 76, the interior portion of data transfer port 18, and cables 96,100 may be encapsulated within bucket-style fire resistant enclosure 10 by pouring or otherwise positioning thermally insulating fire-resistant material 112 within base body cavity 26, wherein the thermally insulation fire-resistant material 112 may be a hydrated Portland cement having between about 40-60% water content and including nylon fibers. Insulation material 112 may fill gaps 78, 86 and may further be positioned to a level sufficient to encapsulate data storage device 76, data transfer port 18, and cables 96,100 within insulation material 112. In particular, insulation material 112 is filled to a level 113 below upper peripheral edge 28 that defines opening 29 of base body cavity 26. For example, insulation material 112 may be filled approximately ¼" below upper peripheral edge 28. Further, insulation material 112 may be in intimate contact with the entire or a substantial portion of data storage device 76, or with the bag that the data storage device 76 is placed within or the sealant that the data storage device 76 was dipped in, if these alternatives are used. About one inch of insulation material 112 may surround the entire, or a substantial portion, of data storage device 76. It will be understood that the fire resistant insulation material 112 that encapsulates data storage device 76 not only provides protection from fire and water, but also serves as a heat sink to allow heat generated by data storage device 76 to be adsorbed into insulation material 112 and dissipated from enclosure 10. The amount of heat adsorbed by insulation material 112 is sufficient to allow data storage device 76 to operate within an acceptable operational temperature range such as, for example, between about 90-100° F. for a 2.5" hard disc drive and below about 140° F. for a 3.5" hard disc drive.

It should also be understood that data storage device 76 may have wireless capability to transfer data without the use of data transfer port 18. Thus, this aspect may be configured to eliminate portion of the data transfer port 18 that allows for the transfer of data and the portion of cable 96 that provides for the transfer of data. Unless data storage device operates on battery power, it should be understood that there still may need to be a port and power cable to provide power to data storage device 76.

Before insulation material 112 cures, base cap 20 is coupled with base body 14 to enclose data storage device 76 in base body 14. Base cap 20 may be formed of a polymeric resin, for example, high density polyethylene (HDPE), that has a melting point higher than the boiling point of water. As best seen in FIGS. 3 and 4, base cap 20 may include an outer peripheral edge 118 comprising a groove 120 operable to secure a gasket 122 therein, and a plurality of downwardly extending flanges 124 having slots 126 defined therein. Gasket 122 may be formed from an elastomer such as, for example, an elastomeric polymerization product of ethylene propylene diene monomer (EPDM) or neoprene. Further, base cap 20 may include a bottom surface 128 having a plurality of posts 130 extending downwardly therefrom for anchoring base cap 20 in insulation material 112.

Base cap 20 is coupled with base body 14 by positioning outer peripheral edge 118 and gasket 122 within internal side surface 36 of side wall 24. Base cap 20 is lowered into base body 14 until slots 126 of flanges 124 interlock with a plurality of base cap anchors 132 extending inwardly from internal side surface 36 of sidewall 24. In this position, posts 130 embed within insulation materials 112 further securing base cap 20 within base body 14 when insulation material 113 cures. It should be understood that an interface 134 is created between base cap 20 and base body 14 that is not in contact with insulation material 112 since insulation material 112 is filled to a level 113 below interface 134. Base body 14 containing encapsulated electronic device 76 and cables 96,100 may then be overturned and an enclosure cover 12 installed over bottom wall 22 and side wall 24 of bucket-style fire resistant enclosure 10.

Manufacturing method and product quality advances are provided by the present invention by forming bucket-style fire resistant enclosure 10 without creating seams in bottom wall 22 and side wall 24 of base body 14 that contact insulation material 112. By forming base body 14 as a one-piece seamless bucket, leaking of insulation material 112 through seams during manufacturing, are eliminated because there are no seams through which to leak. Moreover, insulation material 112 filled within body cavity 26 is not in contact with interface 134 created between base body 14 and base cap 20 because insulation material 112 is filled to a level 113 below interface 134 thereby eliminating any leakage of insulation material 112. Elimination of insulation material 112 leakage increases the probability that a sufficient amount of insulation material 112 is present within the enclosure to meet the design specifications for fire resistant enclosure 10.

Figure 6:
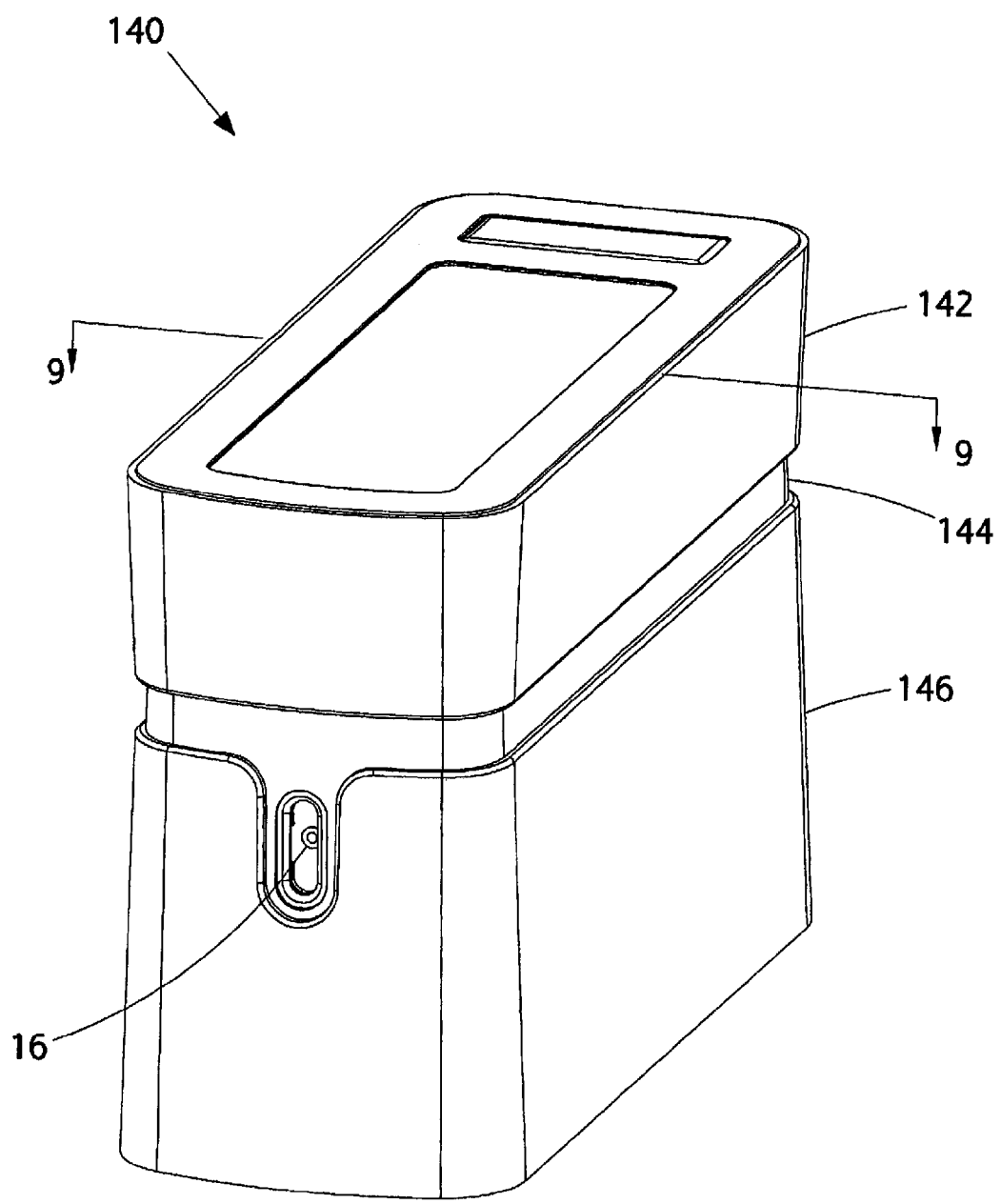
FIG. 6 is a front perspective view of a fire resistant enclosure in accordance with a second aspect of the present invention.
Figure 7:
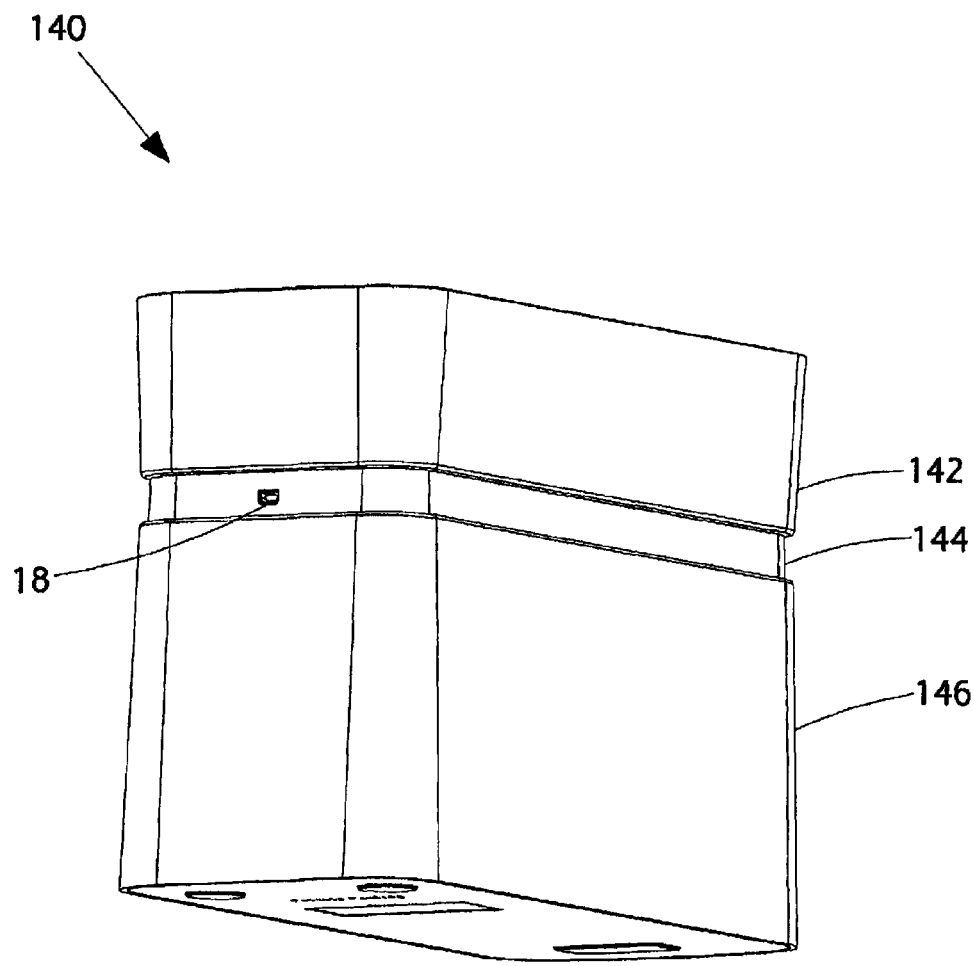
FIG. 7 is a rear perspective view of the fire resistant enclosure shown in FIG. 6.
Figure 8:
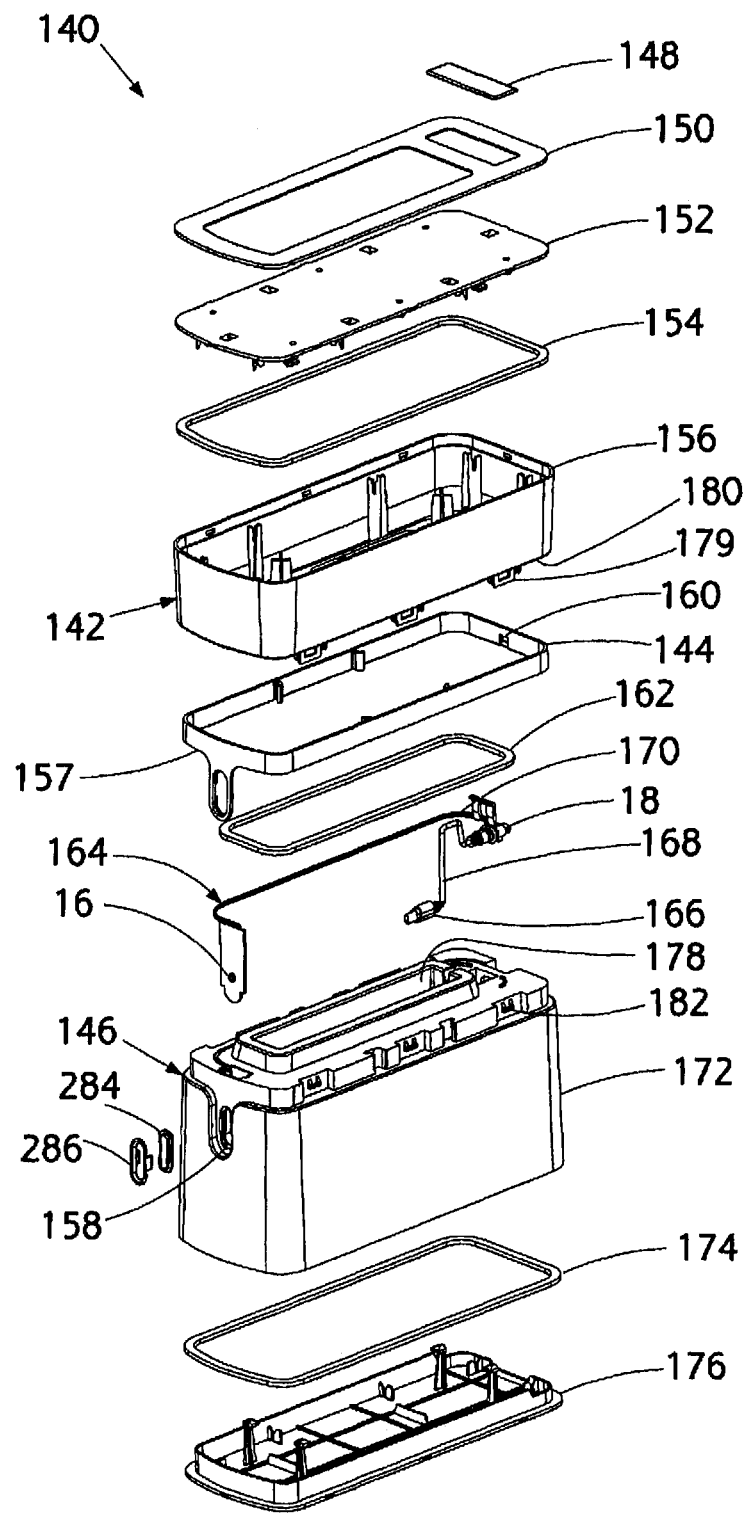
FIG. 8 is an exploded perspective view of the fire resistant enclosure shown in FIG. 6.
Figure 9:
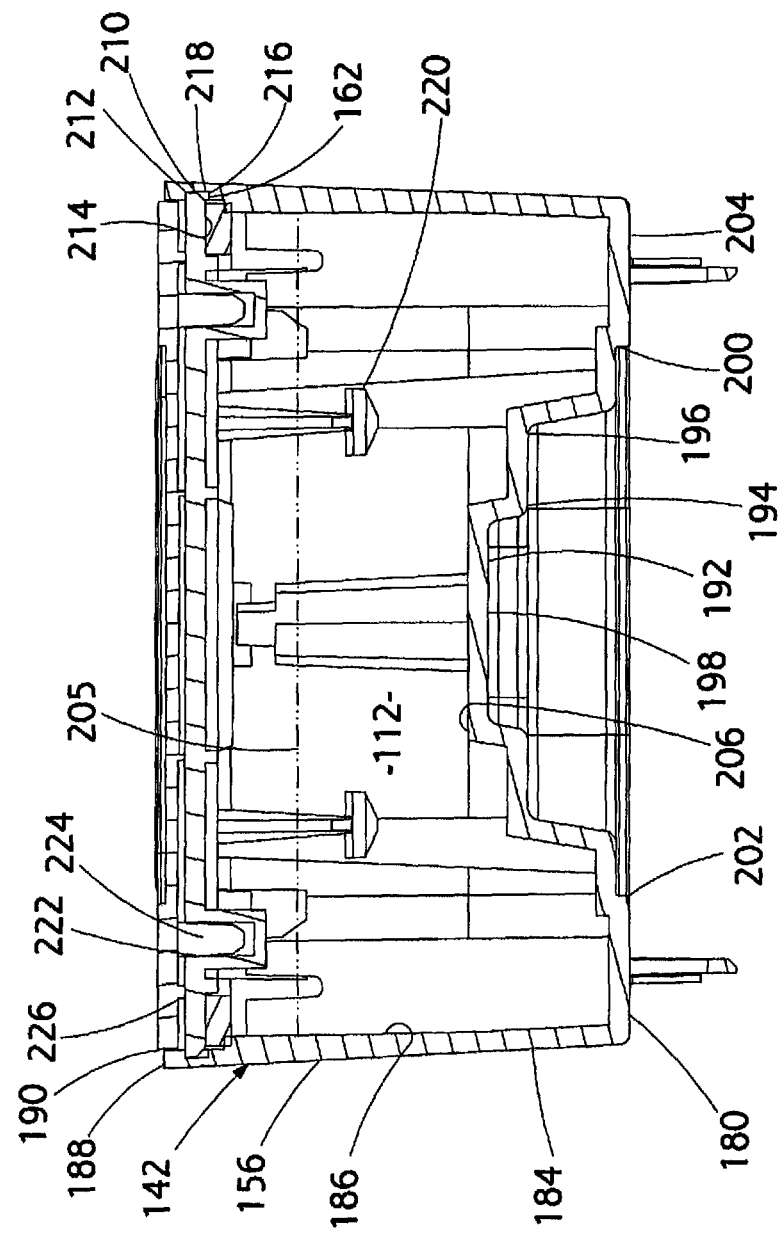
FIG. 9 is a cross sectional view of an enclosure lid taken along line 9-9 of the fire resistant enclosure shown in FIG. 6.
Figure 10:
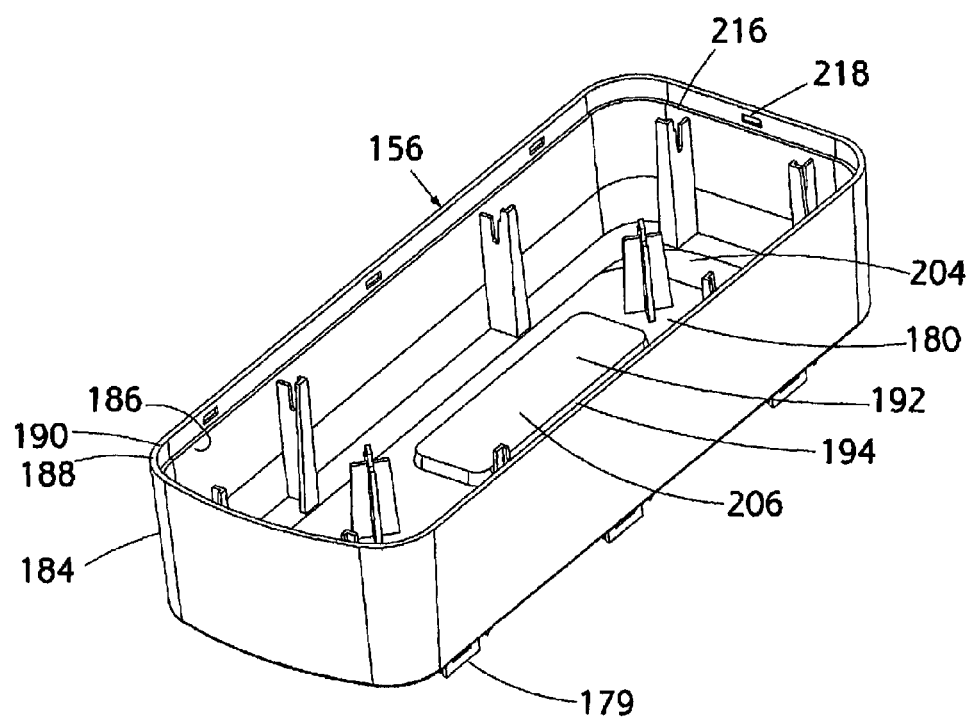
FIG. 10 is a top perspective view of a lid body shown in FIG. 9.

Referring now to FIGS. 6-8, a second aspect of the present invention is shown wherein a bucket-style fire resistant enclosure is generally shown as reference numeral 140. It will be understood that the second aspect of the present invention includes a bucket-style enclosure lid 142 and enclosure base 146, each being filled with thermally insulating fire-resistant material 112 such that insulation material 112 does not contact any seams or interfaces to eliminate leakage of insulation materials 112. Instead of encapsulating data storage device 76 within insulation material 112 as in the first aspect, the enclosure lid 142 and enclosure base 146 are used in conjunction with one another in the second aspect to enclose data storage device 76 within a storage compartment thereby allowing data storage device 76 to be removed from storage compartment.

Enclosure 140 generally includes bucket-style enclosure lid 142, an enclosure collar 144, status indicator 16, data transfer port 18, and bucket-style enclosure base 146. As best seen in FIG. 8 and described in further detail below, enclosure lid 142 may comprise an insert 148, a plate 150, a lid cap 152, a gasket 154, and a lid body 156. Enclosure collar 144 may comprise a status indicator flange 157 operable to mount status indicator 16, and a port clearance hole 160 operable to mount data transfer port 18 in enclosure collar 144. A base interface gasket 162 operates to seal an interface between enclosure lid 142 and enclosure base 146. An electrical cable assembly 164 may comprise a device connector 166, a device cable 168, data transfer port 18, a status indicator cable 170, and status indicator 16. Electrical cable assembly 164 operates to interconnect data storage device 76, data transfer port 18, and status indicator 16. Enclosure base 146 may comprise a base body 172, a gasket 174, and a base cap 176.

Figure 11:
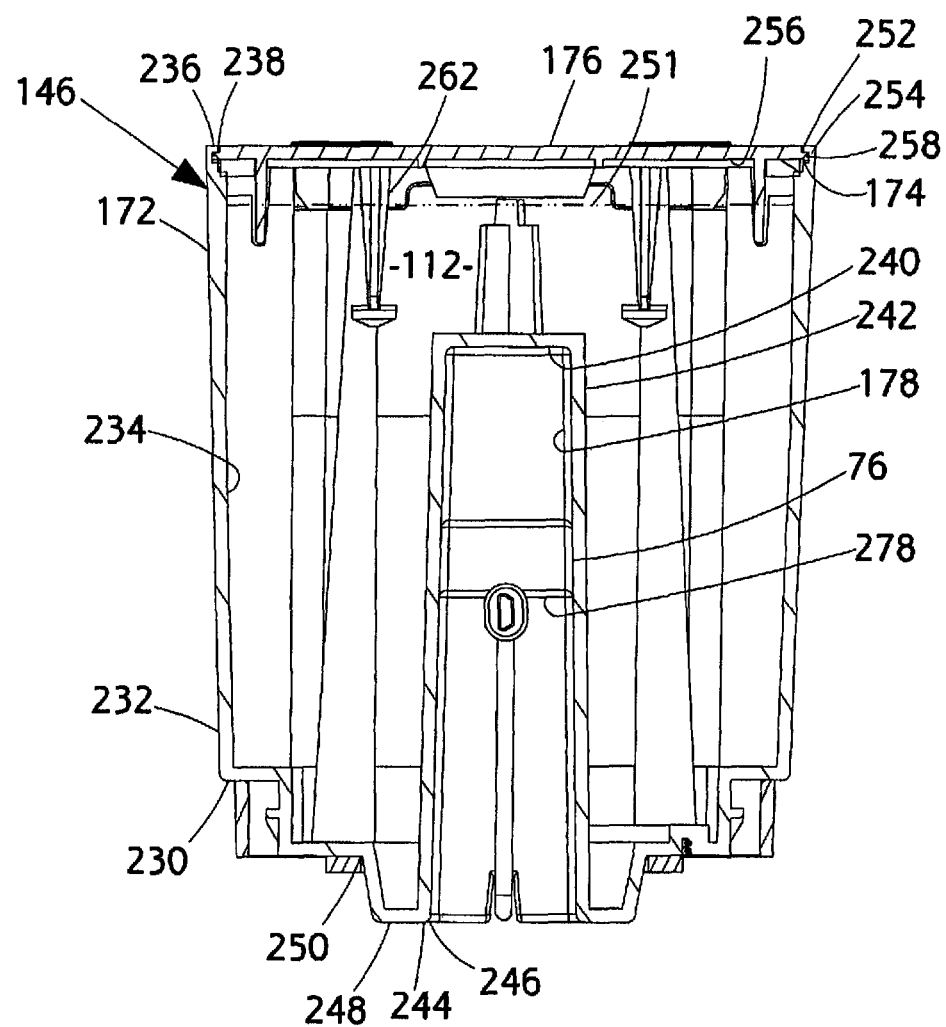
FIG. 11 is an inverted cross sectional view of an enclosure base taken along line 9-9 of the fire resistant enclosure shown in FIG. 6.

In operation, lid body 156 and base body 172 may be filled with fire resistant insulation material 112 and capped. Enclosure base 146 may be overturned and data storage device 76 may be inserted into an internal storage compartment 178 defined in base body 172 and connected to device connector 166 of cable assembly 164. In this aspect, as best seen in FIG. 11, data storage device 76 is not encapsulated or otherwise placed in intimate contact with insulation material 112 as in the first aspect. However, it will be understood that data storage device 76 may be placed in direct or indirect contact with the walls that define internal storage compartment 178, or in close relationship with the walls that define internal storage compartment 178, for example, between about 200 to 300 thousandths of an inch. The walls that define internal storage compartment 178 may be formed of a polymeric resin, for example, high density polyethylene (HDPE), that will act as a heat sink to allow heat generated by data storage device 76 to be adsorbed into the walls of internal storage compartment 178, into insulation material 112 and dissipated from enclosure 140. The amount of heat adsorbed by insulation material 112 is sufficient to allow data storage device 76 to operate within an acceptable operational temperature range such as, for example, between about 90-100° F. for a 2.5" hard disc drive and below about 140° F. for a 3.5" hard disc drive.

As best seen in FIG. 8, data transfer port 18 may be installed in port clearance hole 160 and device cable 168 may connect device connector 166 to data transfer port 18. Status indicator 16 may be mounted in an indicator clearance hole 158 defined in base body 172 and connected to data transfer port 18 by status indicator cable 170. Base interface gasket 162 may be installed upon base body 172 and enclosure collar 144 may be coupled with base interface gasket 162. A plurality of base interface connectors 179 disposed on a seamless bottom wall 180 of lid body 156 may extend downwardly through enclosure collar 144 to interlock with a plurality of lid interface anchors 182 disposed upon base body 172 to couple enclosure lid 142 with enclosure base 146 and enclose data storage device 76 in enclosure 140.

It should also be understood that data storage device 76 may have wireless capability to transfer data without the use of data transfer port 18. Thus, this aspect may be configured to eliminate portion of the data transfer port 18 that allows for the transfer of data and the portion of the cable that provides for the transfer of data. Unless data storage device operates on battery power, it should be understood that there still may need to be a port and power cable to provide power to data storage device 76.

Referring now to FIGS. 6-10, enclosure lid 142 comprises a lid body 156 including seamless bottom wall 180 having a seamless side wall 184 extending upwardly therefrom defining a lid body cavity 186 wherein side wall 184 includes an upper peripheral edge 188 that defines an opening 190 in lid body cavity 186. Bottom wall 180 may comprise a depression top wall 192 having a depression side wall 194 that may include a plurality of steps 196 extending outwardly and downwardly therefrom defining a lid depression 198 wherein depression side wall 192 may further include a lower peripheral edge 200 that defines an opening 202 in lid depression 198. Bottom wall 180 may further comprise a lid bucket-bottom wall 204 extending outwardly from depression side wall 194 to terminate at side wall 184 of lid body 156. Insulation material 112 may be positioned to a level 205 above a top surface 206 of depression top wall 192, for example about one inch, yet below upper peripheral edge 188 that defines opening 190 of lid body cavity 186, for example about ¼" of an inch so that insulation material 112 does not contact an interface formed between the lid cap 152 and lid body 156.

Lid cap 152 may include an outer peripheral edge 210 having a plurality of outwardly extending tabs 212 and a bottom surface 214. Lid cap 152 may be inserted into lid body cavity 186 until bottom surface 214 couples with lid cap gasket 154 disposed upon a peripheral shoulder 216 of side wall 184 of lid body 156. In this position, outwardly extending tabs 212 may interlock with a plurality of slots 218 defined in side wall 184 and a plurality of posts 220 may extend downwardly from bottom surface 214 and embed within insulation materials 112 further securing lid cap 152 within lid body. Lid cap 152 may further comprise a plurality of lid cap receptacles 222 operable to interlock with a plurality of plate connectors 224 extending downwardly from lid cap plate 150 and a plurality of lid cap insert connectors 226 extending downwardly from lid cap insert 148 to secure lid cap plate 150 and lid cap insert 148 to lid cap 152.

Figure 12:
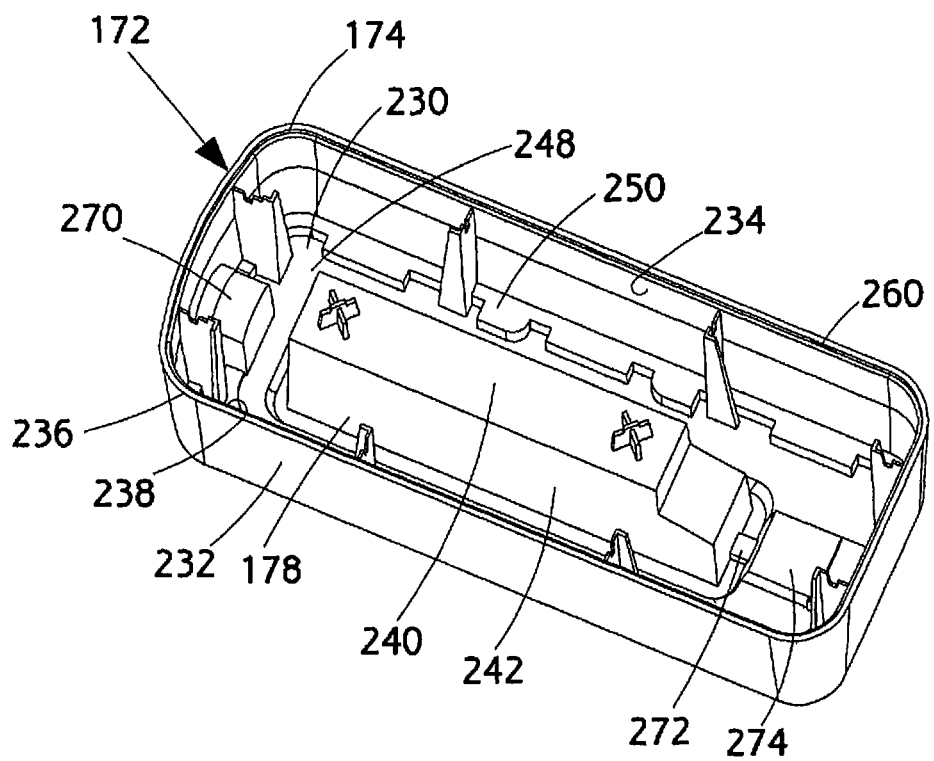
FIG. 12 is top perspective view a base body of the inverted enclosure base shown in FIG. 11.

Enclosure base 146 and enclosure body 172 as shown in FIGS. 11 and 12 are shown in an upside down orientation because base body 172 is a bucket-style body that is filled and capped before overturning it to the orientation as shown in FIGS. 6-8. Referring now to FIGS. 6-8 and 11-13, base body 172 comprises a seamless bottom wall 230 having a seamless side wall 232 extending upwardly therefrom defining a base body cavity 234 wherein side wall 232 includes an upper peripheral edge 236 that defines an opening 238 in base body cavity 234. Bottom wall 230 may comprise a compartment top wall 240 having a compartment side wall 242 extending downwardly therefrom defining storage compartment 178 wherein compartment side wall 242 may further include a lower peripheral edge 244 defining an opening 246 in storage compartment 178. Bottom wall 230 may further comprise a base-bucket bottom wall 248 that may comprise a plurality of steps 250 extending outwardly and upwardly from compartment side wall 242 to terminate at side wall 232 of base body 172. Insulation material 112 may be positioned to a level 251 above compartment top wall 240, for example about one inch, yet below lower peripheral edge 244 that defines opening 246 of base body cavity 234, for example about ¼" of an inch so that so that insulation material 112 does not contact an interface formed between the base cap 176 and base body 172.

Base cap 176 may include an outer peripheral edge 252 having a plurality of outwardly extending tabs 254 and a bottom surface 256. Base cap 176 may be inserted into base body cavity 234 until bottom surface 256 couples with base cap gasket 174 disposed upon a peripheral shoulder 258 of side wall 232. In this position, outwardly extending tabs 254 may interlock with a plurality of slots 260 defined in side wall 232 and a plurality of posts 262 may extend downwardly from bottom surface 256 and embed within insulation material 112 further securing base cap 176 within base body 172. Base body 172 may be capped with base cap 176 and enclosure base 146 overturned to a position operable to mate with enclosure collar 144 and enclosure lid 142.

Figure 13:
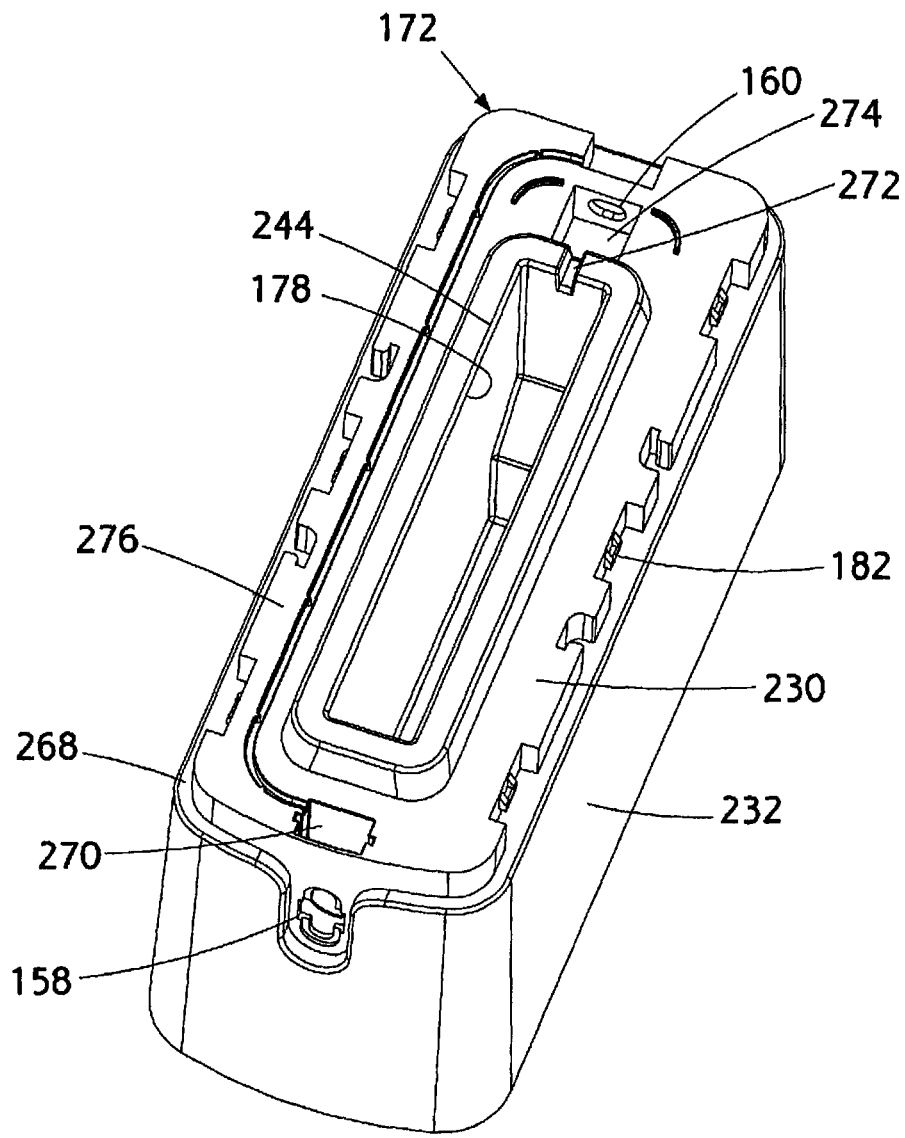
FIG. 13 is a top perspective view of the base body shown in FIG. 8.

As best seen in FIGS. 8 and 13, status indicator 16 and data transfer port 18 may be mounted in clearance holes 158,160. An indicator wiring channel 268, a status indicator trough 270, an electrical port notch 272, and an electrical port trough 274 may be defined in an external surface 276 of bottom wall 230 of base body 172. Device connector 166 of electrical cable assembly 164 may be connected to data storage device 76 that may include one or more peripheral spacing bands 278 wrapped around data storage device 76 that contact the walls of internal storage compartment 178 defined within base body 172, and securely position data storage device 76 within internal storage compartment 178. Status indicator 16 may be connected to data transfer port 18 by status indicator cable 170 routed through indicator wiring channel 268 and status indicator trough 270. Data storage device 76 may be connected to data transfer port 18 by device cable 168 routed through electrical port notch 272 and electrical port trough 274. Status indicator 16 may be secured in place by indicator flange 157 of enclosure collar 144 and a plate 284 that may be covered by an indicator cover 286. Plurality of base interface connectors 179 of enclosure lid 142 may extend through enclosure collar 144 to interlock with plurality of lid interface anchors 182 of enclosure base 146 to couple enclosure lid 142 with enclosure base 146 and data storage device 76 in the fire resistant enclosure 140.

Figure 14:
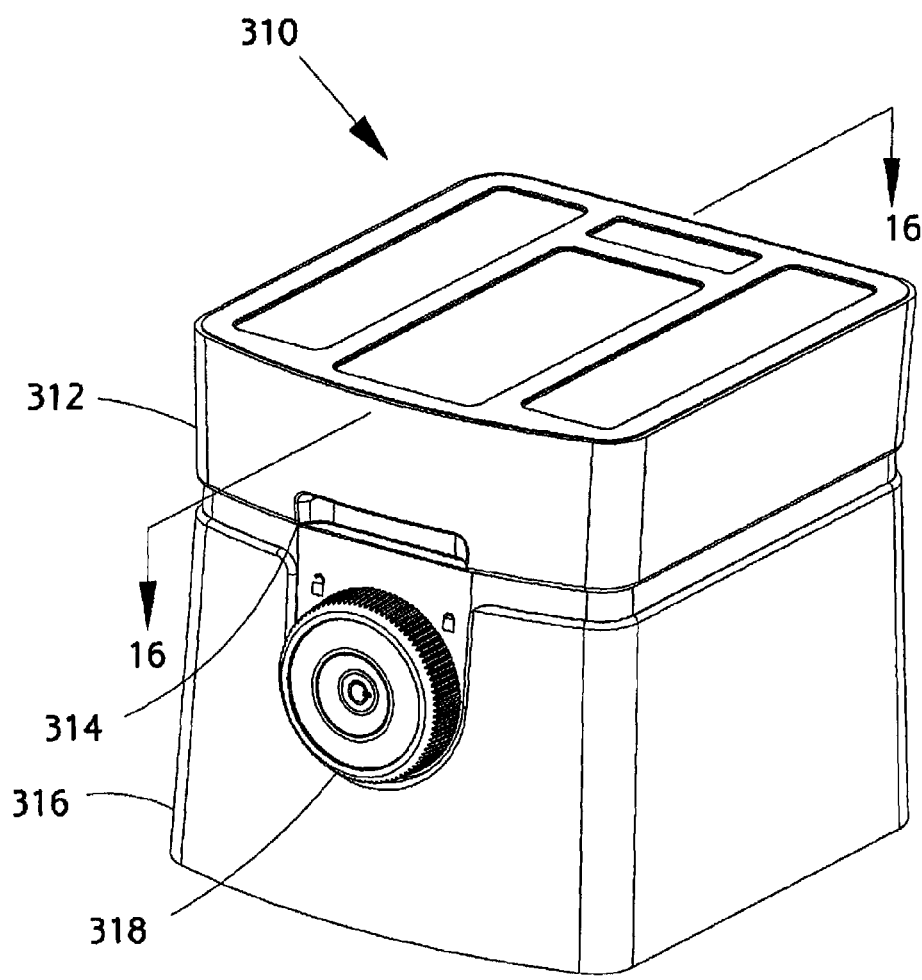
FIG. 14 is a front perspective view of a fire resistant enclosure in accordance with a third aspect of the present invention.
Figure 15:
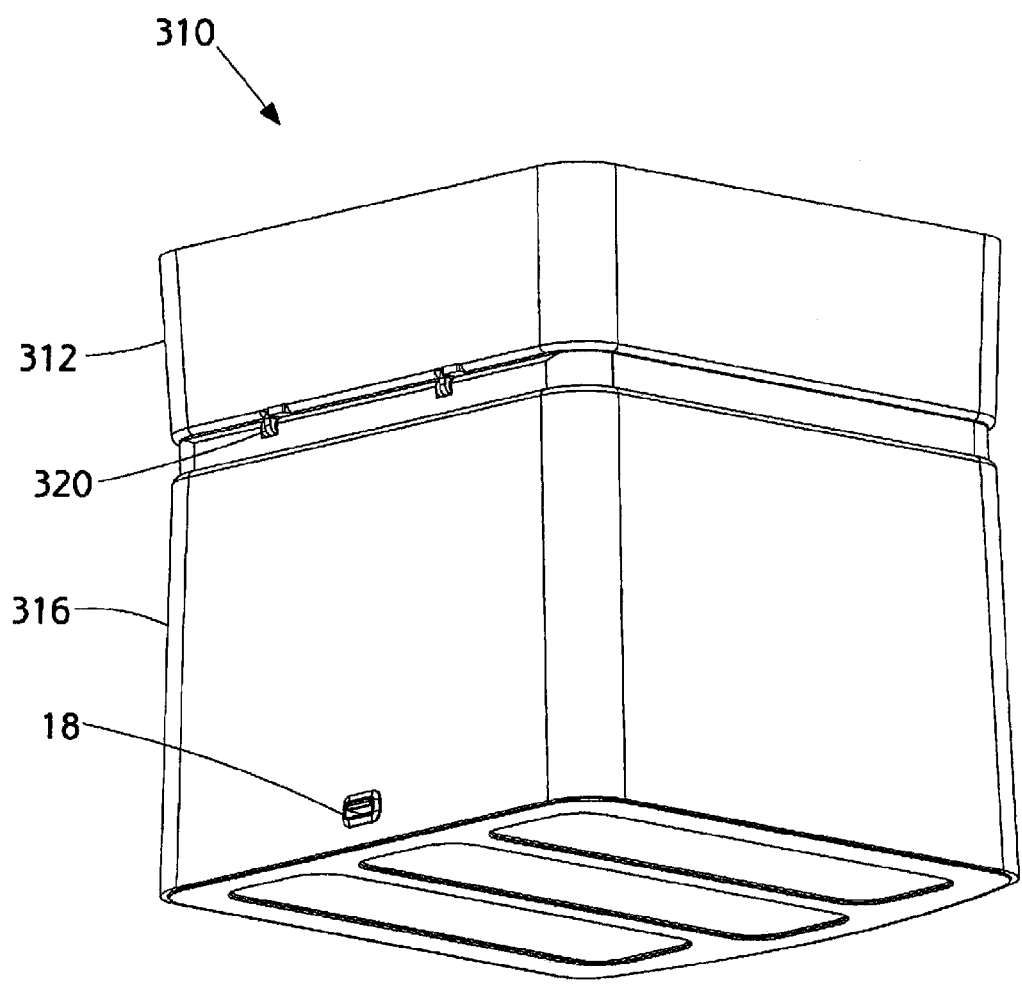
FIG. 15 is a rear perspective view of the fire resistant enclosure shown in FIG. 16.

Referring now to FIGS. 14 and 15, a third aspect of the present invention is shown wherein a bucket-style fire resistant enclosure generally shown as reference numeral 310. This particular aspect of the present invention is similar to the second aspect, except that enclosure 310 includes an enclosure base 316 that is hingedly coupled with an enclosure lid 312 using a hinge 320. Moreover, this aspect includes a locking mechanism 318 for selectively securing enclosure base 316 to enclosure lid 312 to provide additional protection to data storage device 76. Enclosure 310 includes a bucket-style enclosure lid 312 having a lifting notch 314 defined therein. Enclosure 310 may further include a bucket-style enclosure base 316 comprising data transfer port 18 as described above.

Referring now to FIGS. 14-18, a lid body 322 may comprise a seamless bottom wall 324 having a seamless side wall 326 extending upwardly therefrom defining a lid body cavity 328. Side wall 326 includes an upper peripheral edge 330 that defines an opening 332 in lid body cavity 328. Bottom wall 324 may comprise a depression top wall 334 having a depression side wall 336 that may include a plurality of steps 338 extending outwardly and downwardly therefrom defining a lid depression 340 wherein depression side wall 336 may further include a lower peripheral edge 342 that defines an opening 344 in lid depression 340. Bottom wall 324 may further comprise a lid bucket-bottom wall 346 extending outwardly from depression side wall 336 to terminate at side wall 326. Further, bottom wall 324 of lid body 322 may comprise an upwardly extending void side wall 348 including an upper edge 349 and a plurality of side edges 350 that operate with side wall 326 to define a lid lock void 352 within enclosure lid 312. A plurality of flanges 354 may be configured to mate with plurality of steps 338, may extend inwardly from a part of side wall 326 adjacent to hinge 20. Further, bottom wall 324 of lid body 322 may define a slot 356 operable to pass a lock hook 358 that extends upwardly from locking mechanism 318 disposed in a base lock void 360 defined in enclosure base 312. In operation, insulation material 112 may be positioned within lid body cavity 328 to a level 363 above a top surface 364 of depression top wall 334, for example about one inch, yet below upper edge 349 of void side wall 348 and below upper peripheral edge 330, for example about ¼" of an inch, that defines opening 332 of lid body cavity 328.

Lid cap 368 may include an outer peripheral edge 370 comprising a groove 372 operable to secure a gasket 374 therein and a plurality of downwardly extending flanges 376 having slots 378 defined therein. Further, lid cap 368 may include a bottom surface 380 having a plurality of posts 382 extending downwardly therefrom.

Lid cap 368 may be disposed within lid body 322 by coupling outer peripheral edge 370 and gasket 374 with internal side surface 383 of side wall 326. Lid cap 368 may then be lowered into lid body 322 until slots 378 of flanges 376 interlock with a plurality of lid cap anchors 384 disposed upon an internal side surface 383 of side wall 326 of lid body 322. In this position, posts 382 embed within insulation material 112 further securing lid cap 368 within lid body 322 when insulation material 112 cures. By filling insulation materials 112 to a level 363 below an interface 367 where lid cap 368 meets lid body 322, insulation material 112 does not contact interface 367 and does not leak therethough.

Figure 16:
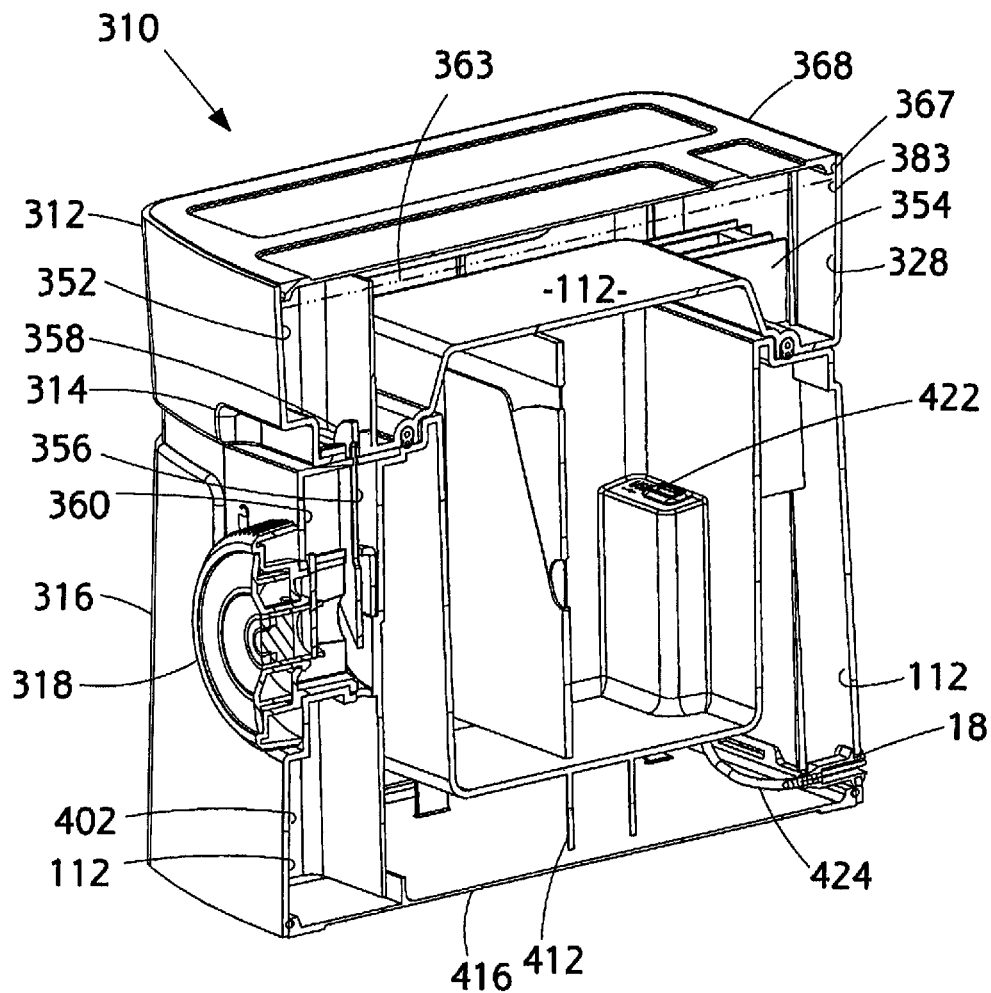
FIG. 16 is a perspective view of a cross section taken along the line 16-16 of the fire resistant enclosure shown in FIG. 14.
Figure 17:
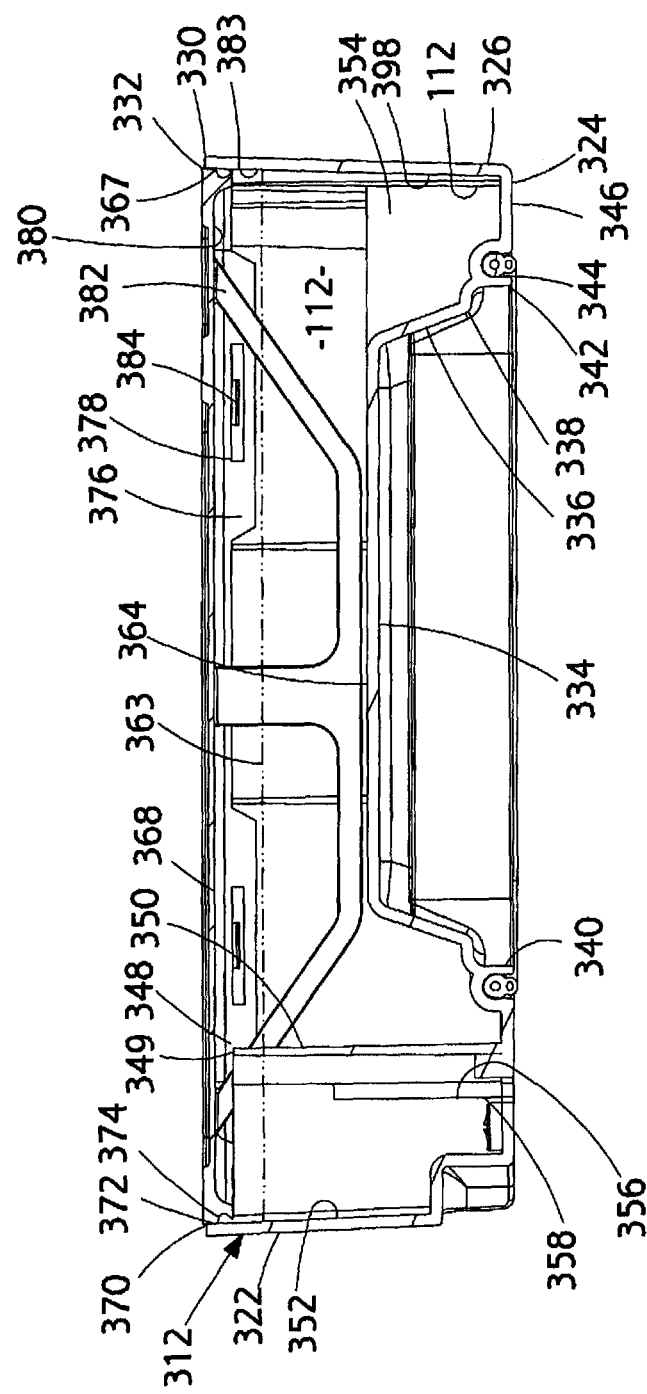
FIG. 17 is a cross sectional view of an enclosure lid taken along line 16-16 of the fire resistant enclosure shown in FIG. 14.
Figure 18:
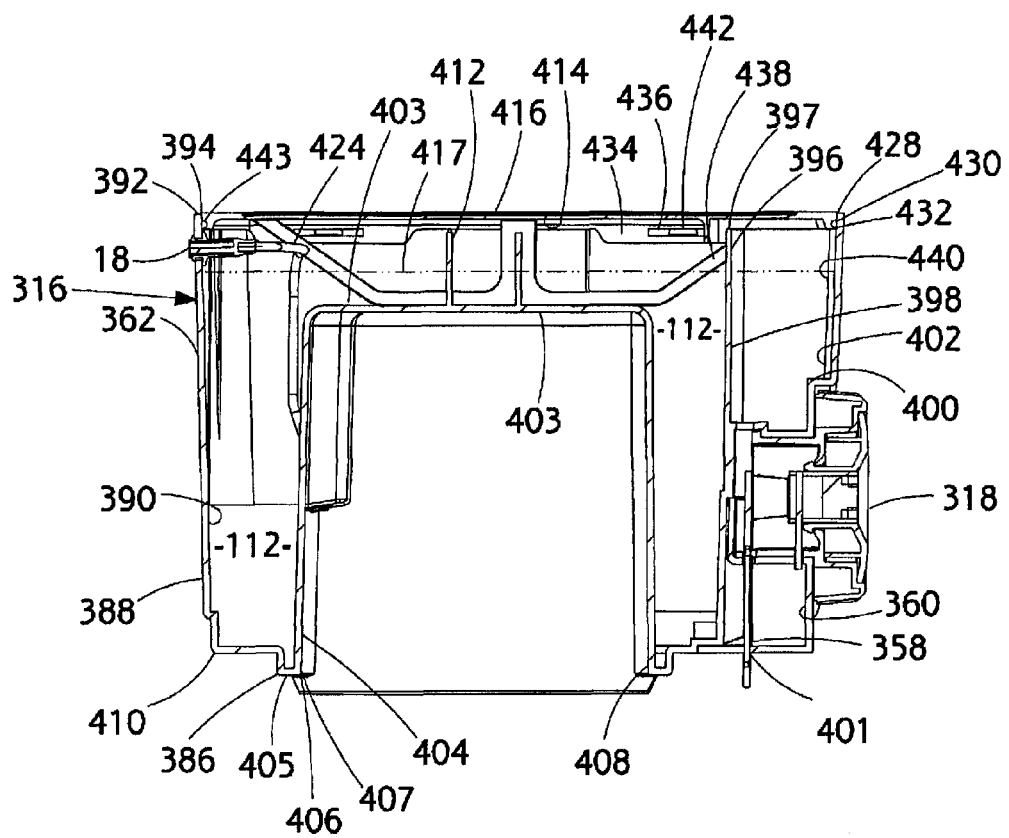
FIG. 18 is an inverted cross sectional view of an enclosure base taken along line 16-16 of the fire resistant enclosure shown in FIG. 14.

As best seen in FIGS. 16-18, enclosure base 316 is shown in an upside down orientation because base body 362 may be a bucket-style body that is filled and capped before overturning it to the orientation as shown in FIGS. 14-16. Base body 362 may comprise a seamless bottom wall 386 having a seamless side wall 388 extending upwardly therefrom defining a base body cavity 390 wherein side wall 388 includes an upper peripheral edge 392 that defines an opening 394 in base body cavity 390. Bottom wall 386 may further comprise an upwardly extending void side wall 396 including an upper edge 397 and a plurality of side edges 398 that operate with side wall 388 of base body 362 to define base lock void 360 within enclosure base 316. Void side wall 396 may include a void partition wall 400 that extends outwardly above locking mechanism 318 to terminate at side wall 388 of base body 362 thereby defining a cavity 402 within base lock void 360 above locking mechanism 318. Further, bottom wall 386 of base body 362 may define a base void slot 401 operable to mate with lid void slot 358 defined in bottom wall 324 of lid body 322 and to pass lock hook 358 of locking mechanism 318 in enclosure base 316 to enclosure lid 312.

Bottom wall 386 of base body 362 may further comprise a compartment top wall 403, a compartment side wall 404, and a base-bucket bottom wall 405. Compartment side wall 404 may extend downwardly from compartment top wall 403 and terminate at base-bucket bottom wall 405 of bottom wall 386 thereby defining a storage compartment 408 in base body 362 for data storage device 76. Compartment side wall 404 may comprise a lower peripheral edge 406 that defines an opening 407 in storage compartment 408.

Base-bucket bottom wall 404 may comprise a plurality of steps 410 extending outwardly and upwardly from compartment side wall 404 to terminate at side wall 388 of base body 362. Compartment top wall 403 may further comprise a plurality of upwardly extending spacers 412 that operate to couple with a bottom surface 414 of a base cap 416 upon installation of base cap 416 within base body 362. An internal data transfer port 422 may be mounted to an interior wall of base body 362 within storage compartment 408 and a device cable 424 may be routed through base body cavity 390 to connect to external data transfer port 18. Insulation material 112 may be positioned within base body cavity 390 to a level 417 above compartment top wall 403 of bottom wall 386, for example about one inch, and up to upper edge 397 of void side wall 396, yet below upper peripheral edge 392, for example about ¼" of an inch, that defines opening 394 of base body cavity 390. So positioned, insulation material 112 may encapsulate device cable 424 and storage compartment 408 within base body 362.

As with the previous aspects, it should be understood that data storage device 76 may have wireless capability to transfer data without the use of internal and external data transfer ports 18, 422. Thus, this aspect may be configured to eliminate portion of the data transfer port 18 that allows for the transfer of data and the portion of the cable that provides for the transfer of data. Unless data storage device operates on battery power, it should be understood that there still may need to be a port and power cable to provide power to data storage device 76.

Base cap 416 may include an outer peripheral edge 428 comprising a groove 430 operable to secure a gasket 432 therein, and a plurality of downwardly extending flanges 434 having slots 436 defined therein. Further, bottom surface 414 of base cap 416 may include a plurality of posts 438 extending downwardly therefrom.

Base cap 416 may be disposed within base body 362 by coupling outer peripheral edge 428 and gasket 432 with an internal side surface 440 of side wall 388. Base cap 416 may be lowered into base body 362 until slots 436 of flanges 434 interlock with a plurality of base cap anchors 442 disposed upon internal side surface 440 of sidewall 388. By filling insulation material 112 to a level below interface 443 where base cap 416 meets base body 362, the insulation material does not contact interface 443 and does not leak therethrough. In this position, posts 438 embed within insulation material 112 further secures base cap 416 within base body 362 when insulation cures. The filled and capped enclosure base 316 may be overturned, data storage device 76 may be inserted into storage compartment 408 and connected to device connector 422. Further, enclosure lid 312 may be closed relative to enclosure base 316 and selectively locked using locking mechanism 318.

Figure 19:
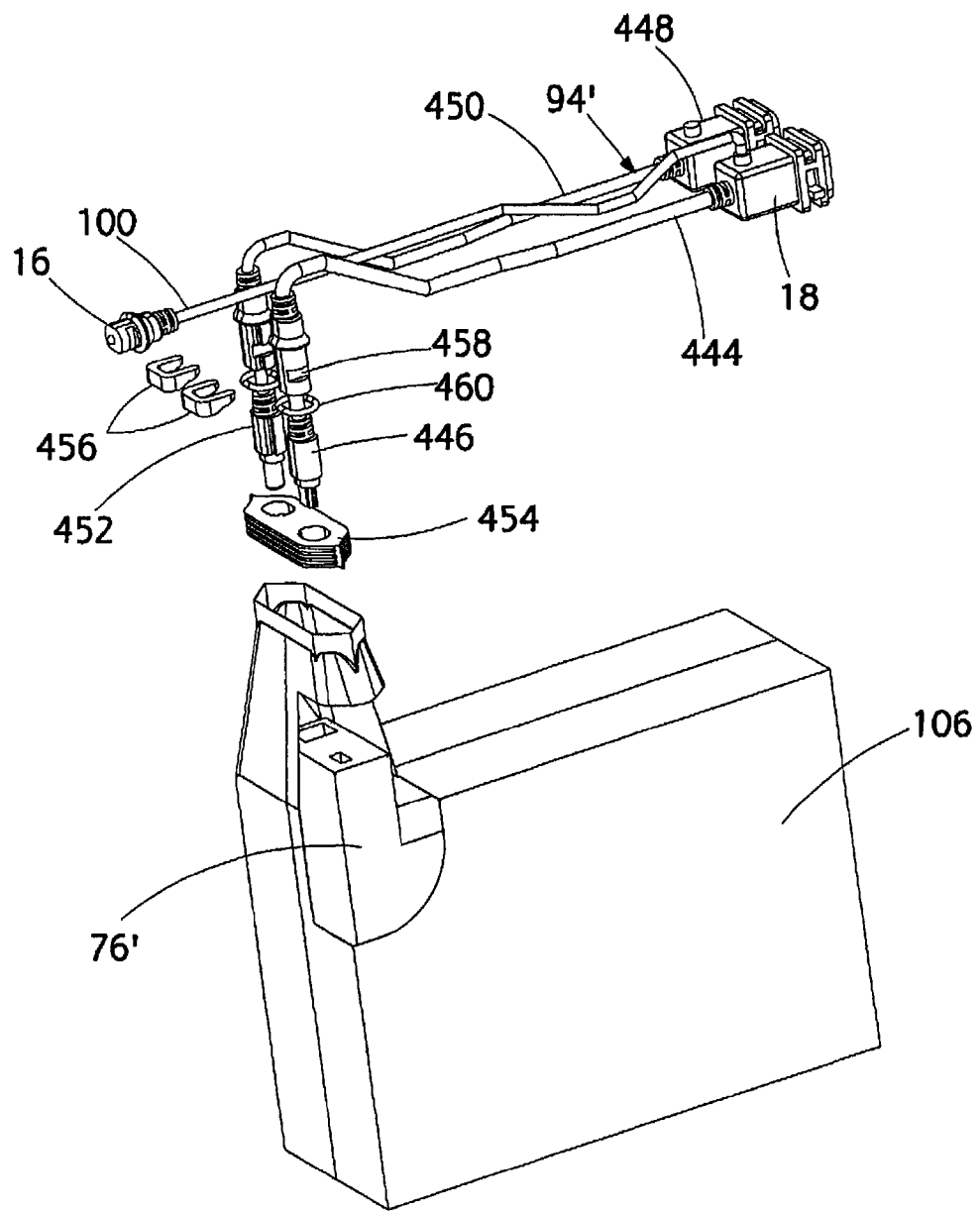
FIG. 19 is an exploded perspective view of a data storage device enclosed within a bag, wherein a portion of the bag is broken away.

While the above-mentioned aspects of the present invention have been described with reference to a data storage device 76 shown in FIGS. 3-5 and 11, which is shown as a 2.5" hard disc drive, it should be understood that this data storage device may also be a 3.5" hard disc drive which is identified as reference numeral 76' in FIG. 19. As best seen in FIG. 19, the data storage device 76' may be encased in barrier 106, such as a bag formed of a multi-layer (e.g., 2 layers) coextruded film that is about 5 millimeters thick, such as a FS 5050 film manufactured by Cryovac Sealed Air Corporation, Duncan, S.C. Data storage device 76' may be connected to an electrical cable assembly 94', which may comprise data transfer port 18, a data transfer cable 444, and a data transfer connector 446. The data transfer connector 446 may plug into data storage device 76' so that data transfer cable 444 may transmit data and/or communication signals between data storage device 76' and data transfer port 18. Data transfer port 18 may be, for example, a USB connection port. Electrical cable assembly 94' may also include a DC power port 448, a DC power cable 450, and a DC power connector 452 to plug into data storage device 76' so that DC power cable 450 may provide power to data storage device 76' through DC power port 448. Electrical cable assembly 94' may further comprise status indicator 16, such as an LED, and a status indicator cable 100 to conduct signals indicating conditions such as, but not limited to, power status of data storage device 76' to status indicator 16.

As best seen in FIG. 19, data storage device 76' may be placed within barrier 106, such as a bag, and the DC power cable 450 and data transfer cable 444 are fed through a seal fitment 454. DC power connector 452 and data transfer connector 454 are then plugged into data storage device 76' and seal fitment 454 is sealably bonded or otherwise fitted with the barrier 106 so that moisture or fire-resistant insulation does not pass into barrier 106 when the data storage device 76' is encapsulated in the enclosure. Further, a pair of retaining clips 456 are used to engage undercuts 458 formed in data transfer connector 446 and DC power connector 452 and provide compression on O-rings 460, which forms a seal between electrical cable assembly 94' and seal fitment 454. It will be understood that the advantages discussed above with respect to the data storage device 76 also generally apply to the data storage device 76'.

While the invention has been described by reference to various specific aspects, it should be understood that numerous changes may be made within the spirit and scope of the inventive concepts described. Accordingly, it is intended that the invention not be limited to the described aspects, but will have full scope defined by the language of the following claims.

What is claimed is:

1. A fire resistant enclosure comprising: an enclosure base comprising a base cap and a bucket-style base body, said base body including a bottom wall with a side wall extending upwardly therefrom defining a base cavity, said side wall including an upper peripheral edge that defines an opening in said base cavity;
   a data storage device positioned within said base cavity; and
   a fire resistant insulation material positioned within said base cavity to encapsulate said data storage device, wherein said insulation material fills said base cavity to a level below said upper peripheral edge, wherein said base cap is configured to couple with said base body to enclose said data storage device within said enclosure base,
wherein a bottom surface of said base cap comprises:
   a plurality of base cap flanges having slots defined therein, said slots configured to interlock with a plurality of base cap anchors extending from said side wall of said base body; and
   a plurality of downwardly extending posts that embed within said fire resistant insulation material positioned within said base body cavity upon interlocking of said base cap flanges with said base cap anchors.

2. The fire resistant enclosure in accordance with claim 1 further comprising an electrical cable assembly including a device cable connecting said data storage device to a data transfer port.

3. The fire resistant enclosure in accordance with claim 1 wherein said level below said upper peripheral edge is approximately 0.25 inches.

4. The fire resistant enclosure in accordance with claim 1 wherein said base body is seamless.

5. The fire resistant enclosure in accordance with claim 1 wherein said base cap comprises a peripheral edge coupled with an internal surface of said side wall of said base body.

6. The fire resistant enclosure in accordance with claim 1 wherein said data transfer port is mounted in a port clearance hole defined in said side wall of said base body.

7. The fire resistant enclosure in accordance with claim 1 wherein said base body includes a device support structure for positioning said data storage device within said base cavity, wherein said device support structure includes a device length spacer and a device width spacer extending upwardly from said bottom wall and inwardly from said side wall.

8. The fire resistant enclosure in accordance with claim 1 wherein said electrical cable assembly further comprises a status indicator cable connected to a status indicator mounted in an indicator clearance hole defined in said side wall of said base body, said status indicator cable further connected to said data transfer port and encapsulated in said base cavity.

9. The fire resistant enclosure in accordance with claim 8 wherein said device storage structure comprises an internal storage compartment defined in said base body.

10. A fire resistant enclosure comprising:
   an enclosure base comprising a base cap and a bucket-style base body, said base body including a bottom wall with a side wall extending upwardly therefrom defining a base cavity, said side wall of said base body including an upper peripheral edge that defines an opening in said base cavity, wherein fire resistant insulation material is positioned within said base cavity, wherein said insulation material fills said base cavity to a level below said upper peripheral edge of said base body, and wherein said base cap is configured to couple with said upper peripheral edge of said base body; and an enclosure lid comprising a lid cap and a bucket-style lid body, said lid body including a bottom wall with a side wall extending upwardly therefrom defining a lid cavity, said side wall of said lid body including an upper peripheral edge that defines an opening in said lid cavity, wherein fire resistant insulation material is positioned within said lid cavity, wherein said insulation material fills said lid cavity to a level below said upper peripheral edge of said lid body, wherein said lid cap is configured to couple with said upper peripheral edge of said lid body, and wherein said enclosure base and said enclosure lid are configured to define a storage compartment therebetween.

11. The fire resistant enclosure in accordance with claim 10 wherein said level below said upper peripheral edge of said base body and said lid body is approximately 0.25 inches.

12. The fire resistant enclosure in accordance with claim 10 wherein said lid cap further comprises:
a bottom surface and a plurality of tabs extending outwardly from said peripheral edge of said lid cap, wherein said bottom surface is coupled with a peripheral shoulder defined in said side wall of said lid body; and
a plurality of posts extending downwardly from said bottom surface and embedded within said fire resistant insulation material, wherein said plurality of tabs are coupled with a plurality of slots defined in said wall of said lid body.

13. The fire resistant enclosure in accordance with claim 10 further comprising a data storage device positioned within said storage compartment.

14. The fire resistant enclosure in accordance with claim 10 further comprising:
a data transfer port mounted to said side wall of said base body;
an electrical cable assembly including a device cable for connecting a data storage device to said first data transfer port.

15. The fire resistant enclosure in accordance with claim 10 further comprising:
a first data transfer port mounted to said side wall of said base body;
a second data transfer port mounted to an internal wall of said base body for access with said storage compartment; and
an electrical cable assembly including a device cable for connecting said first data transfer port and said second data transfer port.

16. The fire resistant enclosure in accordance with claim 10 wherein a bottom surface of said lid cap comprises:
a plurality of lid cap flanges having slots defined therein, said slots configured to interlock with a plurality of lid cap anchors extending from said side wall of said lid body; and
a plurality of posts embedded within said fire resistant insulation material positioned within said lid cavity upon interlocking of said lid cap flanges with said lid cap anchors.

17. The fire resistant enclosure in accordance with claim 1 wherein said fire resistant insulation material is in direct contact with said data storage device.

* * * * *